(12) United States Patent
Irisawa et al.

(10) Patent No.: US 8,780,217 B2
(45) Date of Patent: Jul. 15, 2014

(54) SHAKE CORRECTING SYSTEM WITH SLIDE MECHANISM WHICH ALLOWS UNIT TO BE FREELY MOVABLE, LENS BARREL, IMAGING DEVICE AND HAND-HELD DATA TERMINAL

(75) Inventors: Shigeru Irisawa, Chigasaki (JP); Takehide Ohno, Yokohama (JP); Koichi Muramatsu, Yokohama (JP); Takashi Ando, Kawasaki (JP); Keiji Ohkubo, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 429 days.

(21) Appl. No.: 13/202,003

(22) PCT Filed: Feb. 26, 2010

(86) PCT No.: PCT/JP2010/053693
§ 371 (c)(1),
(2), (4) Date: Aug. 17, 2011

(87) PCT Pub. No.: WO2010/101260
PCT Pub. Date: Sep. 10, 2010

(65) Prior Publication Data
US 2012/0038784 A1  Feb. 16, 2012

(30) Foreign Application Priority Data

Mar. 4, 2009 (JP) ................................. 2009-051355
Aug. 20, 2009 (JP) ................................. 2009-191357

(51) Int. Cl.
*H04N 5/225* (2006.01)
*G03B 5/00* (2006.01)

(52) U.S. Cl.
CPC ...................................... *G03B 5/00* (2013.01)

USPC ........................................................ 348/208.7

(58) Field of Classification Search
CPC .. H04N 5/228; H04N 5/23264; H04N 5/2368
See application file for complete search history.

(56) References Cited

U.S. PATENT DOCUMENTS 3,968,504 A * 7/1976 Komine ........................... 396/71
5,897,226 A * 4/1999 Okada et al. ................... 396/55
7,133,224 B2  11/2006 Irisawa (Continued)

FOREIGN PATENT DOCUMENTS

CN     101246293 A    8/2008
EP     1 791 350 A2   5/2007

(Continued)

*Primary Examiner* — Gary C Vieaux
(74) *Attorney, Agent, or Firm* — Dickstein Shapiro LLP

(57) ABSTRACT

A shake correcting system includes an optical imaging system, an image sensor, a movable unit comprising a movable frame in which the image sensor is fixed and a rotation restricting element, a base movably supporting the movable unit in a predetermined plane substantially orthogonal to an optical axis of the optical imaging system, a drive mechanism driving the movable unit relative to the base in directions vertical and orthogonal to the optical axis, a blur correcting function to correct blurs in a subject image due to shakes of the shake correcting system, a rotation restricting mechanism preventing rotation of the movable frame around the optical axis with the rotation restricting element, and a slide mechanism allowing the movable unit to be freely movable in the predetermined plane, and comprising a magnet, a magnetic plate attracted to the magnet, a spherical element supported between the magnetic plate and the magnet.

18 Claims, 39 Drawing Sheets

(56) References Cited

U.S. PATENT DOCUMENTS

| | | |
|---|---|---|
| 7,286,164 B2 | 10/2007 | Shinohara et al. |
| 7,433,137 B2 | 10/2008 | Irisawa |
| 2001/0028516 A1 | 10/2001 | Noguchi |
| 2006/0056830 A1* | 3/2006 | Tanaka et al. ............ 396/55 |
| 2006/0164516 A1 | 7/2006 | Kurosawa |
| 2006/0285839 A1 | 12/2006 | Tomita |
| 2007/0091181 A1 | 4/2007 | Serikawa et al. |
| 2007/0141920 A1* | 6/2007 | Mogamiya ............... 439/752 |
| 2007/0154195 A1 | 7/2007 | Irisawa et al. |
| 2007/0222544 A1 | 9/2007 | Seo |
| 2008/0043287 A1 | 2/2008 | Shinohara et al. |
| 2008/0151063 A1 | 6/2008 | Mogamiya |
| 2008/0187301 A1 | 8/2008 | Takahashi |
| 2008/0198462 A1 | 8/2008 | Sekino |
| 2009/0086040 A1 | 4/2009 | Ohno |
| 2009/0128637 A1* | 5/2009 | Noji ....................... 348/208.1 |
| 2009/0189987 A1 | 7/2009 | Muramatsu et al. |
| 2009/0208196 A1 | 8/2009 | Ohno et al. |
| 2010/0178044 A1 | 7/2010 | Ohno |

FOREIGN PATENT DOCUMENTS

| | | |
|---|---|---|
| JP | 2002-290816 A | 10/2002 |
| JP | 2006-203624 A | 8/2006 |
| JP | 2006-349942 A | 12/2006 |
| JP | 2006-350157 A | 12/2006 |
| JP | 2007-102062 A | 4/2007 |
| JP | 3969927 B2 | 6/2007 |
| JP | 2007-219388 | 8/2007 |
| JP | 2007-256561 A | 10/2007 |
| JP | 2008-77047 A | 4/2008 |
| JP | 2008-160947 A | 7/2008 |
| JP | 2008-191266 A | 8/2008 |
| WO | WO 2008/012868 A1 | 1/2008 |
| WO | WO 2008012868 A1 * | 1/2008 |

* cited by examiner ated by the optical imaging system; a movable unit which comprises a
SHAKE CORRECTING SYSTEM WITH SLIDE MECHANISM WHICH ALLOWS UNIT TO BE FREELY MOVABLE, LENS BARREL, IMAGING DEVICE AND HAND-HELD DATA TERMINAL

TECHNICAL FIELD

The present invention relates to a shake correcting system which corrects a camera shake occurring when capturing a subject image on an image sensor for the purpose of generating a good, clear image as well as a lens barrel, an imaging device and a hand-held data terminal each of which incorporates such a shake correcting system.

BACKGROUND ART

Some imaging device such as a digital camera comprises a shake correcting system in order to prevent a blur in an image due to camera shakes and generate a clear image. Such a shake correcting system has to be compact in size for preventing an increase in size of the imaging device in which it is mounted. Also, it has to be driven by a small power as much as possible so as to reduce consumption of electric batteries.

There are two types of shake correcting systems, one correcting a camera shake by moving a correction lens and the other by moving an image sensor. Japanese Patent No. 3969927 (Reference 1) discloses a shake correcting system with a correction lens which comprises a movable element holding the lens, a fixed element restricting movement of the movable element in an optical axis direction, three balls placed between the movable element and the fixed element and relatively movable to the movable element and the fixed element, at least three restrictors provided for the three balls respectively, and a driver driving the movable element. The at least three restrictors are provided in the movable element or the fixed element to adjust the relative positions of the three balls to be within predetermined ranges. The predetermined ranges are set to be such values that the balls are not to hit the restrictors when they move by a half of the maximum mechanical movable amount of the movable element from the center of the ranges or a half of the maximum moving amount of the movable element for a camera shake correction.

Japanese Laid-open Patent Publication No. 2006-350157 (Reference 2) discloses a shake correcting system which comprises a correction lens, a movable element holding the lens, a guide element which limits movement of the movable element to a base in the optical axis direction and guides the movable element to move in a plane orthogonal to the optical axis, a rotation restrictor which restricts rotation of the movable element around the optical axis. Reference 2 aims to downsize the shake correcting system by disposing the rotation restrictor and the guide element so that a part of the rotation restrictor and the guide element overlap in the optical axis direction.

The invention disclosed in Reference 1 has a disadvantage in an increase in the size of the corrector in the optical axis direction because the elements are arranged outwardly in a radial direction around the optical axis. The invention disclosed in Reference 2 can reduce the size thereof in the optical axis direction by the overlapping arrangement of the rotation restrictor and guide element, however, it is still disadvantageous in increasing thickness of the corrector in the optical axis direction.

Japanese Laid-open Patent Publication No. 2008-77047 discloses a shake correcting system correcting camera shakes by moving the image sensor which comprises a first movable frame with a first guide and on which the image sensor is mounted, a second movable frame having a first guide shaft and a second guide contacting with the first guide to movably support the first movable frame, and a fixed frame having a second guide shaft contacting with the second guide to movably support the second movable frame. The first guide shaft is made of a magnetic material and the first movable frame includes, on the first guide shaft, a permanent magnet which biases the first movable frame in such a direction as to make the first guide and the first guide shaft contact with each other. The magnetic force of the permanent magnet can prevent the guides from wobbling.

In the invention in Reference 3 the movable frame can be moved smoothly since the guide shaft and the movable frame are constantly in contact with each other by the magnetic force. However, it is necessary to generate a large magnetic force enough to overcome the own weight of the moving elements including the image sensor in order to prevent them from wobbling. Because of this, it has a disadvantage that friction resistance between the guide shafts and the movable frames are increased.

SUMMARY OF THE INVENTION

The present invention aims to provide a shake correcting system which corrects camera shakes by moving an image sensor in a plane orthogonal to the optical axis of a lens and is configured so as to reduce a load due to friction on sliding portions to reduce necessary electric power for operation, as well as to provide a lens barrel, an imaging device, and a hand-held data terminal incorporating such a shake correcting system. Also, the present invention aims to provide a shake correcting system which is reduced in both of size and thickness in the optical axis direction as well as a lens barrel, an imaging device, and a hand-held data terminal incorporating such a shake correcting system.

According to one aspect of the present invention, a shake correcting system comprises an optical imaging system; an image sensor which converts an optical image of a subject formed on a light receiving face by the optical imaging system into an electric signal; a movable unit which comprises a movable frame in which the image sensor is fixed and a rotation restricting element; a base which movably supports the movable unit in a predetermined plane substantially orthogonal to an optical axis of the optical imaging system; a drive mechanism which drives the movable unit relative to the base in two directions vertical and orthogonal to the optical axis; a blur correcting function to correct a blur in the subject image due to a shake of the shake correcting system by moving the image sensor in an opposite direction to a direction of the blur with the drive mechanism; a rotation restricting mechanism which prevents rotation of the movable frame around the optical axis with the rotation restricting element; and a slide mechanism which allows the movable unit to be freely movable in the predetermined plane, and comprises a magnet, a magnetic plate attracted to the magnet, a spherical element supported between the magnetic plate and the magnet.

Preferably, the shake correcting system further comprises a latch mechanism which latches the movable unit in the base at a default position when the blur correcting function is not used.

Preferably, in the shake correcting system, the slide mechanism and the latch mechanism are disposed so that the magnetic plate and the spherical element are maximally attracted to the magnet when the movable unit is placed in the default position relative to the base.

Preferably, in the shake correcting system, the movable unit and the base are provided with three slide mechanisms.

Preferably, a latch portion of the latch mechanism is placed within a triangle of lines connecting positions of the three slide mechanisms.

Preferably, the movable frame includes an inclination adjust mechanism which finely adjusts an inclination of the light receiving face of the image sensor relative to the optical axis.

Preferably, the movable frame comprises an image sensor frame in which the image sensor is fixed and an outer frame supporting the image sensor frame, and comprises, between the outer frame and the image sensor frame, a movable support portion as a support point and two adjusting portions to adjust a position of the image sensor frame relative to the outer frame. Preferably, the inclination adjust mechanism is configured to finely adjust the inclination of the light receiving face of the image sensor relative to the optical axis by adjusting the position of the image sensor frame with the two adjusting portions.

Preferably, the shake correcting system further comprises a tilt prevention mechanism which prevents the movable unit from tilting relative to the base when the movable unit hits the base at both ends of a movable area in the two directions.

Preferably, the tilt prevention mechanism is comprised of a contact face provided in one of the base and the movable unit and a protrusion provided in the other of the base and the movable unit and having a convex face at top end. The tilt prevention mechanism is configured that the contact face and the protrusion hit each other when the movable unit hits the base at both ends of the movable area in the two directions.

Preferably, two tilt prevention mechanisms are provided at both ends of the movable area in one of the two directions, respectively, and are positioned with substantially equal distances from a line of action of drive force in the one of the two directions.

Preferably, the slide mechanism is provided in the rotation restricting element.

Preferably, the drive mechanism comprises a plurality of coils and a plurality of magnets facing the coils for driving the movable frame.

According to another aspect of the present invention, a lens barrel, an imaging device and a hand-held data terminal incorporating the above shake correcting system is provided.

BRIEF DESCRIPTION OF THE DRAWINGS

Features, embodiments, and advantages of the present invention will become apparent from a detailed description with reference to the following drawings.

DESCRIPTION OF THE EMBODIMENTS

Hereinafter, embodiments of a shake correcting system, a lens barrel, an imaging device, and a hand-held data terminal according to the present invention will be described in detail with reference to the accompanying drawings.

Figure 21:
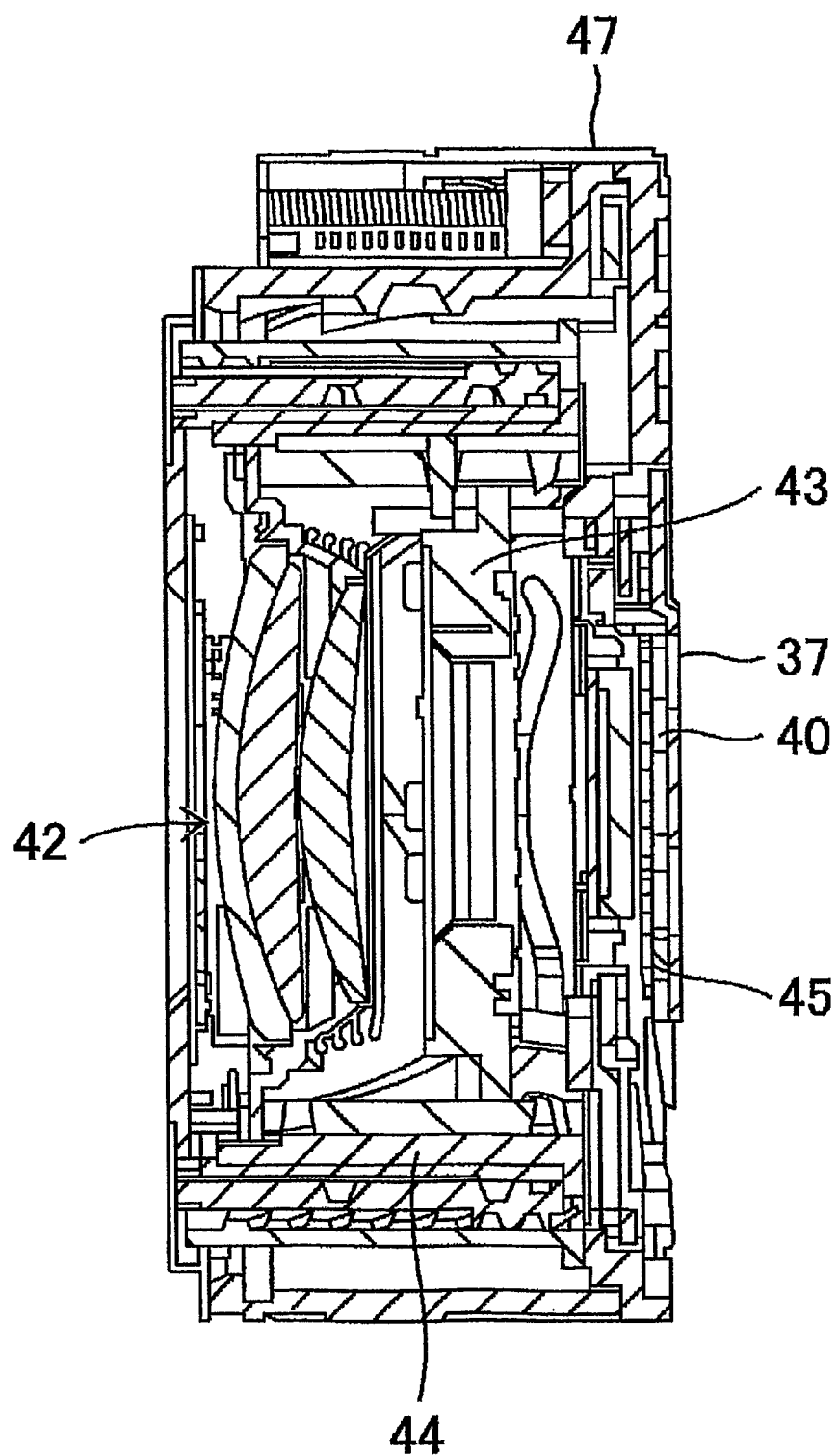
FIG. 21 is a vertical cross sectional view of one example of a lens barrel incorporating the shake correcting system according to the present embodiment when a lens system is in a contained state.

First, an example of a lens barrel incorporating a shake correcting system according to the present invention will be described with reference to FIG. 21. FIG. 21 shows a lens barrel of a collapsible type when an optical imaging system is contained in a body of an imaging device. The lens barrel includes a cylindrical fixed element 47 which is fixed in the body of an imaging device such as a camera, and a lens drive mechanism 44 incorporated in the inner circumference of the fixed element 47 and comprising a rotary cylinder which is rotated by a motor to forward/retreat relative to the fixed element 47, a forward cylinder which goes straight in the optical axis direction together with the rotary cylinder, a lens holding frame and a shutter mechanism 43. The forward cylinder includes a groove in the optical direction and the rotary cylinder includes a cam groove in the inner circumferential wall. The lens holding frame and shutter mechanism are provided with a cam follower inserting through the forward cylinder to fit in the cam groove. The lens holding frame holds an optical imaging system 42.

Upon power-on of the imaging device, the rotary cylinder is rotated to protrude from the contained state in FIG. 21 in the optical axis direction and the forward cylinder linearly protrudes. The intersection of the cam groove of the rotary cylinder and the groove of the forward cylinder is moved in the optical axis direction, protruding the lens holding frame with the cam follower and the shutter mechanism 43. Accordingly, the optical imaging system 42 in the lens holding frame is protruded to be ready for shooting. There are various optical systems available, and depending on the structure of an optical system, it can be configured to include another lens which forwards in the back of the optical imaging system 42 along with the protruding. Further, there is a known zoom lens system whose focal length changes by the rotation of the rotary cylinder. Any known optical system and lens drive system can be used arbitrarily; therefore, a description thereof is omitted.

Behind the lens barrel, a shake correcting system comprising a base 37, a back yolk 40, and a movable frame 1 are mounted. The shake correcting system is configured to adjust the positions of the movable frame 1 and the image sensor in accordance with a camera shake detection signal to correct camera shakes. Examples of the shake correcting system will be described in the following.

First Embodiment

Figure 1:
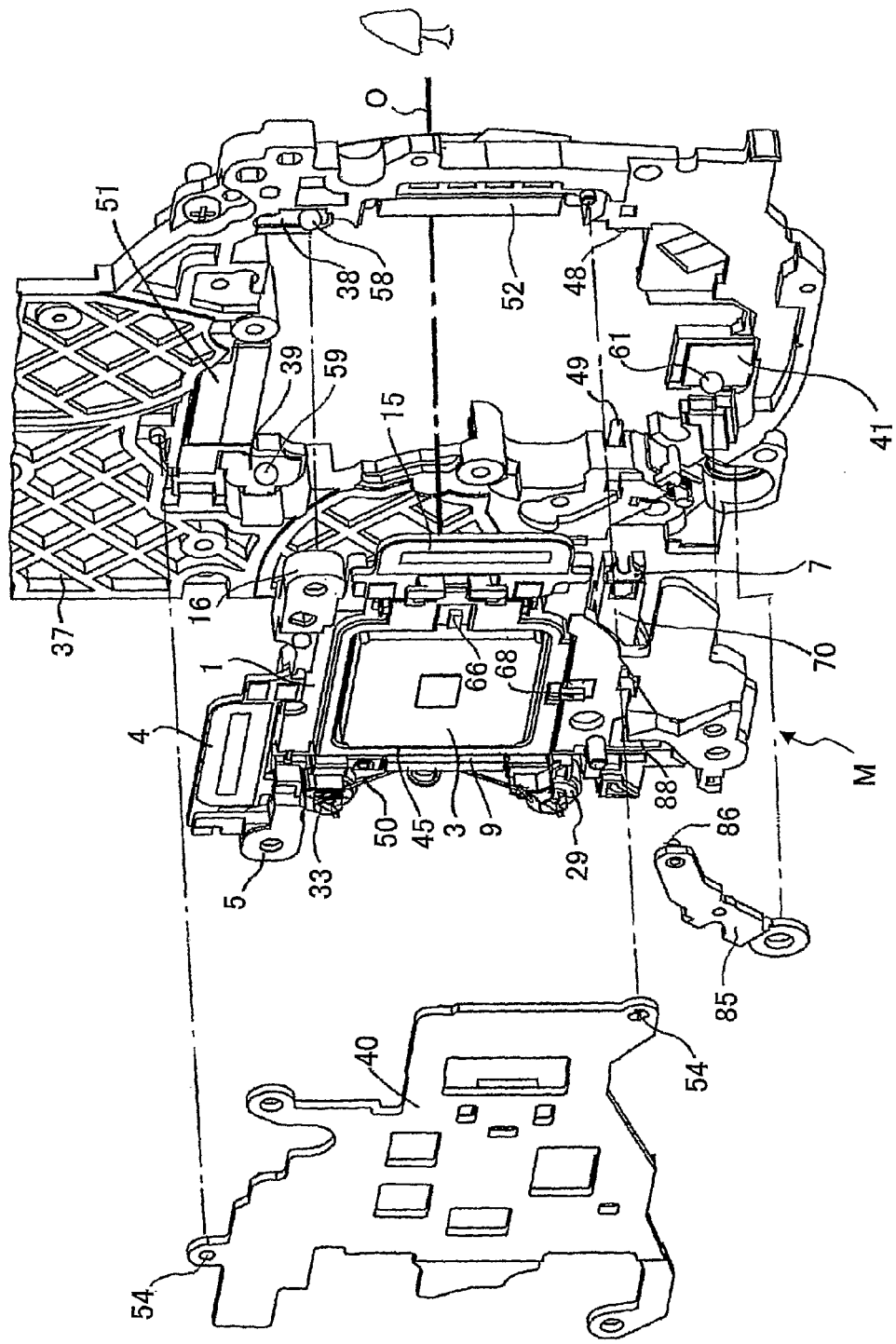
FIG. 1 is an exploded perspective view of a shake correcting system according to a first embodiment of the present invention seen from a back side of an image sensor.

The shake correcting system according to the first embodiment will be described with reference to FIG. 1 to FIG. 20. The shake correcting system comprises a base 37 to place the movable frame 1 between the base 37 and a plate-like back yolk 40 and movably support it in a plane orthogonal to the optical axis. The movable frame 1 integrally holds an image sensor frame 45 on which an image sensor 3 as a CCD is mounted via a later described inclination adjust mechanism. The base has openings in which various elements as the movable frame 1, the image sensor frame 45 and the image sensor 3 are placed. The back yolk 40 includes a number of holes 54 into which protrusions of the base 37 are fitted, with the movable frame 5 placed between the back yolk 40 and the base 37. In FIG. 1 the optical axis is indicated by an alphabetic code, "O" and the right side is a subject side.

The movable frame 1 is movable along an intermediate shaft 9 integrally vertically standing on a rotation restrictor (rotation restricting element) 70 which is movable along horizontal shafts 48, 49 fixed on the base 37. Thus, the movable frame 1 and the image sensor 3 are movable in two directions orthogonal to each other. The movable frame 1 in which the image sensor 3 is fixed and the rotation restrictor 70 constitute a movable unit M (FIG. 1). Further, positional shifts of the image sensor 3 in the optical axis direction are prevented by a slide mechanism using a magnetic force. In the following a bi-directional drive mechanism for the movable frame 1, a rotation restricting mechanism, and the slide mechanism will be described in detail.

Figure 2:
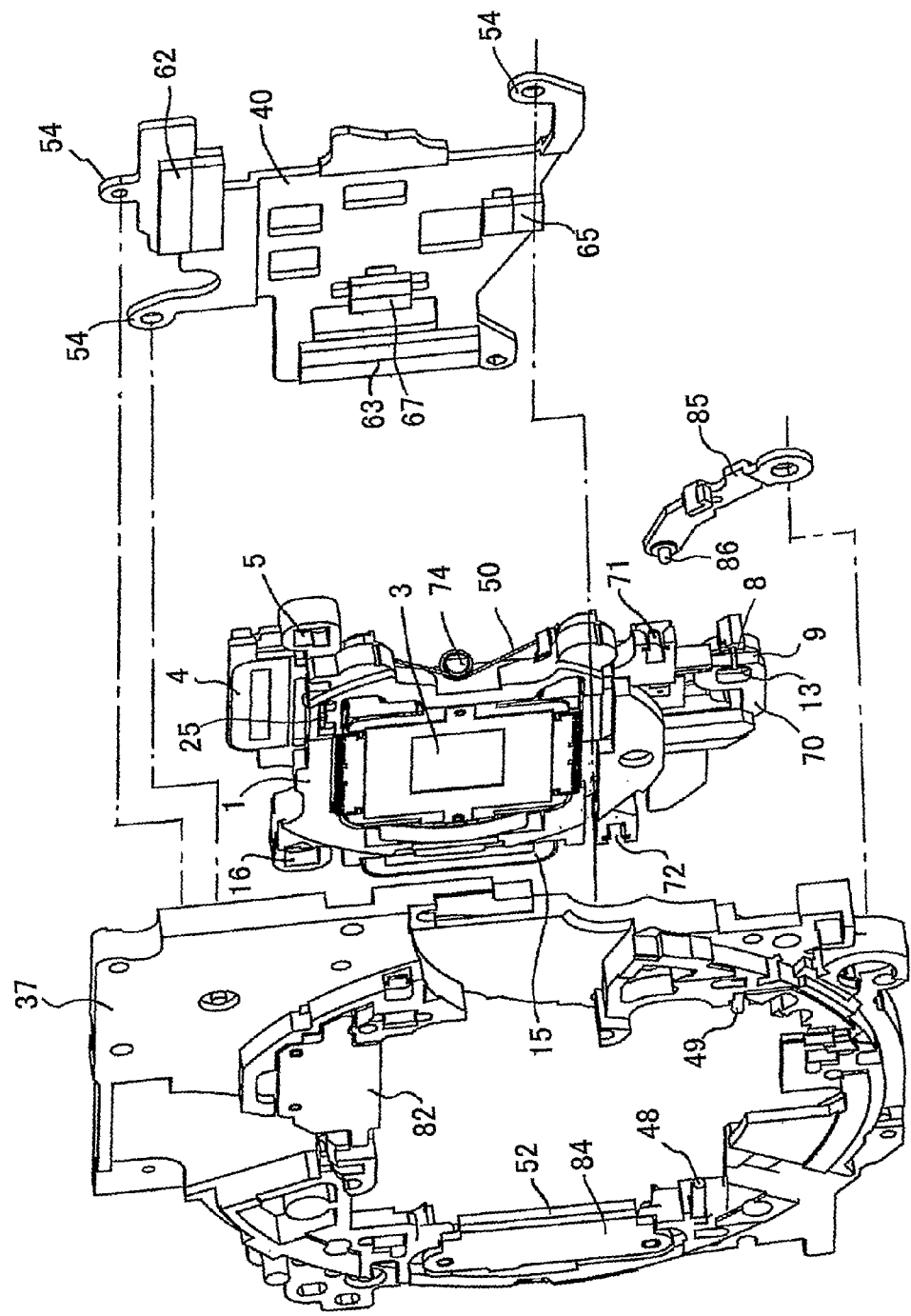
FIG. 2 is an exploded perspective view of the shake correcting system in FIG. 1 seen from a front side of the image sensor.
Figure 3:
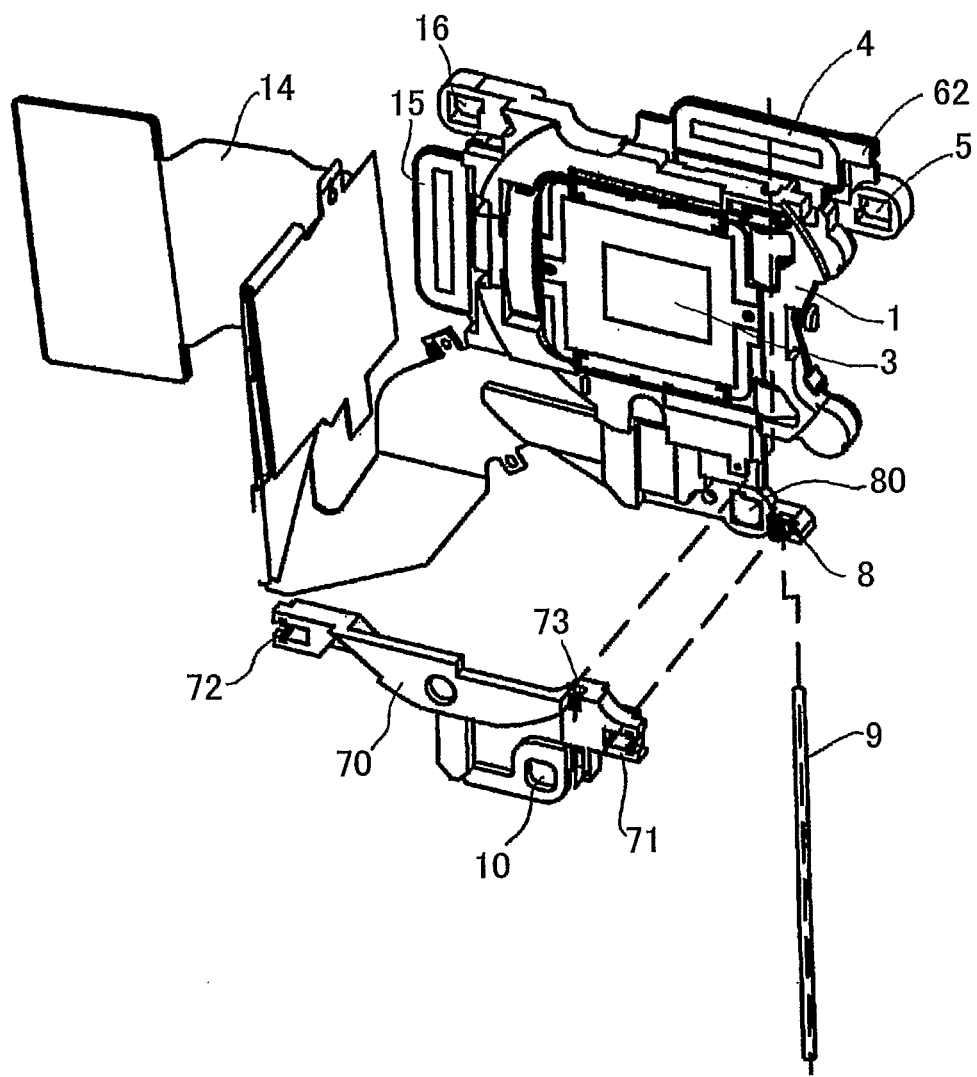
FIG. 3 is an exploded perspective view of the front side of the shake correcting system with a rotation restrictor and an intermediate shaft disassembled.
Figure 4:
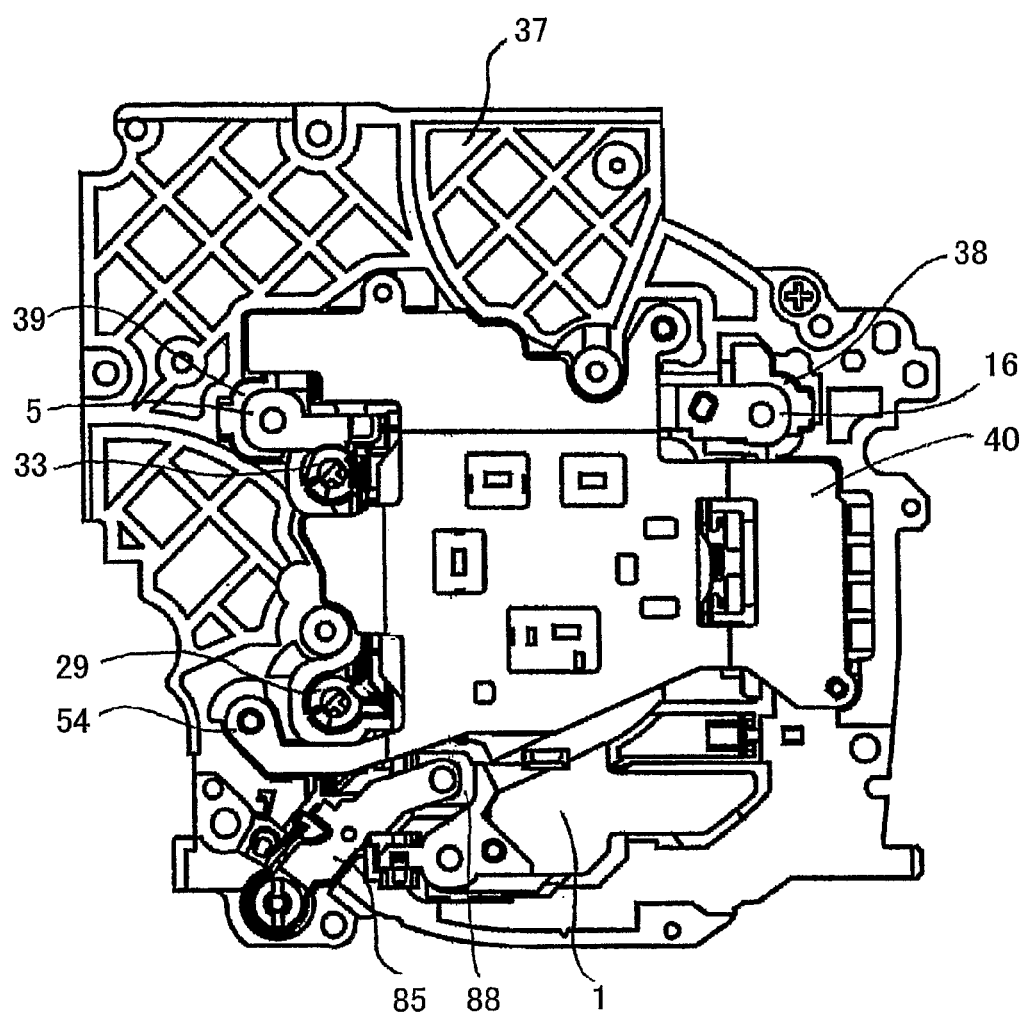
FIG. 4 is a back view of the shake correcting system without a flexible print circuit board.
Figure 5:
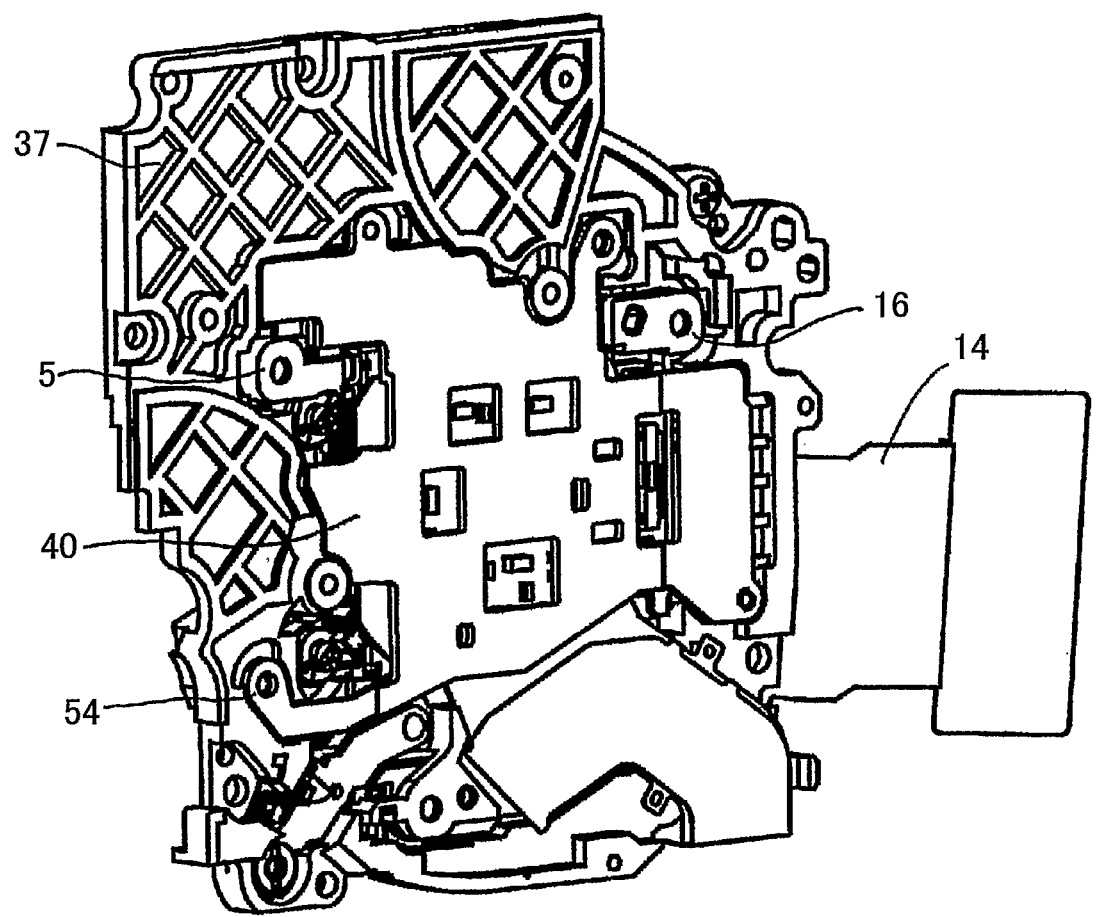
FIG. 5 is a perspective view of a back side of the shake correcting system in FIG. 4.
Figure 6:
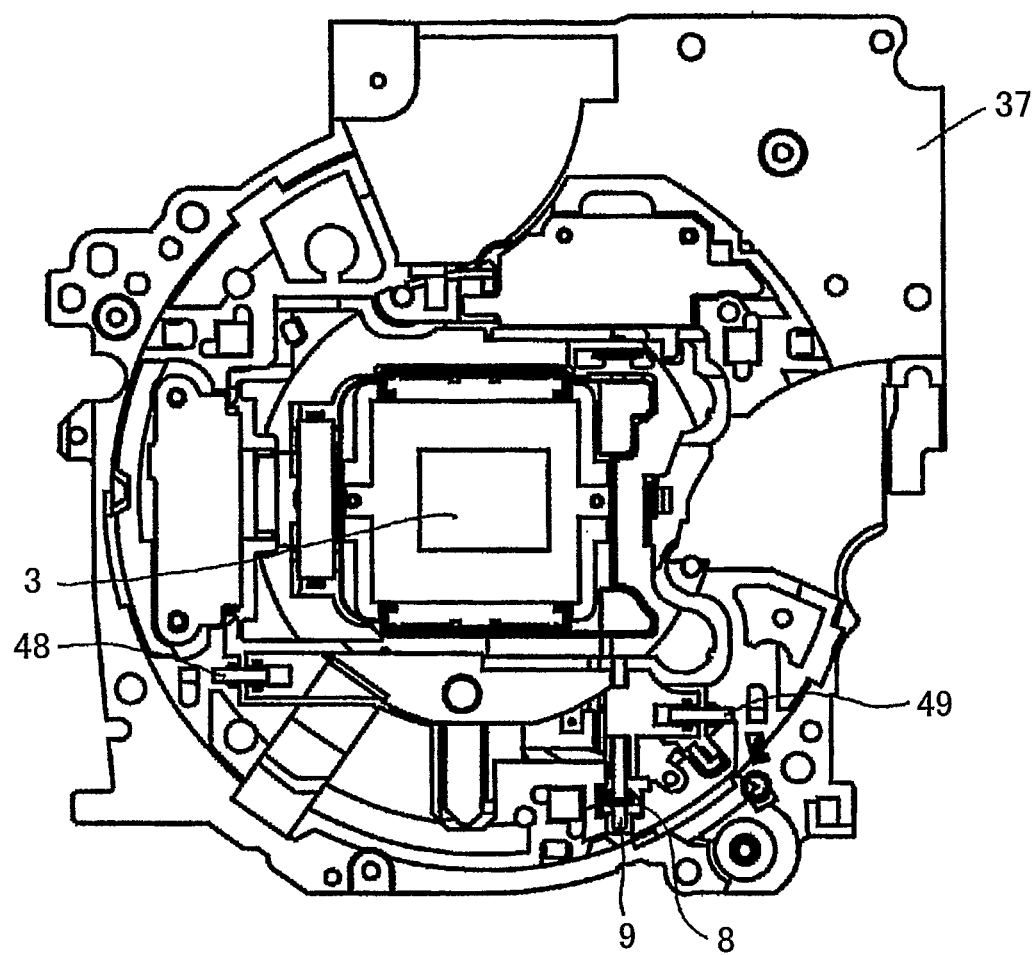
FIG. 6 is a front view of the shake correcting system in FIG. 5.
Figure 7:
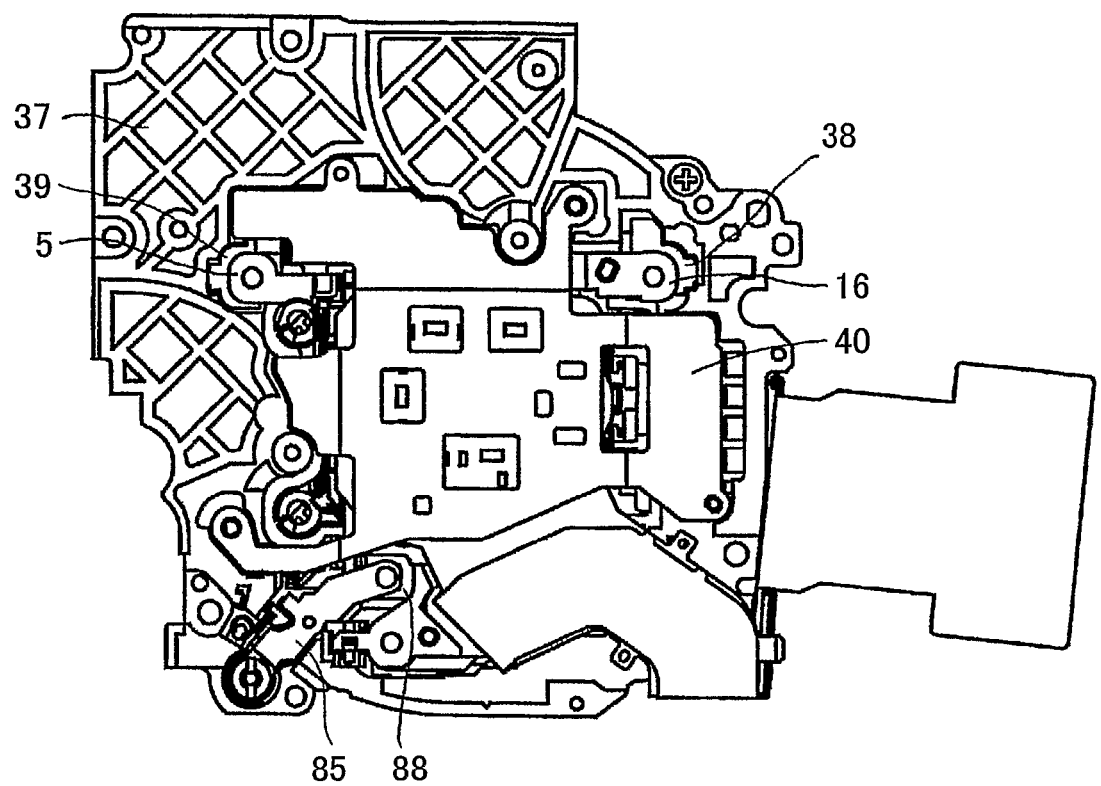
FIG. 7 is a back view of the shake correcting system in FIG. 6.
Figure 8:
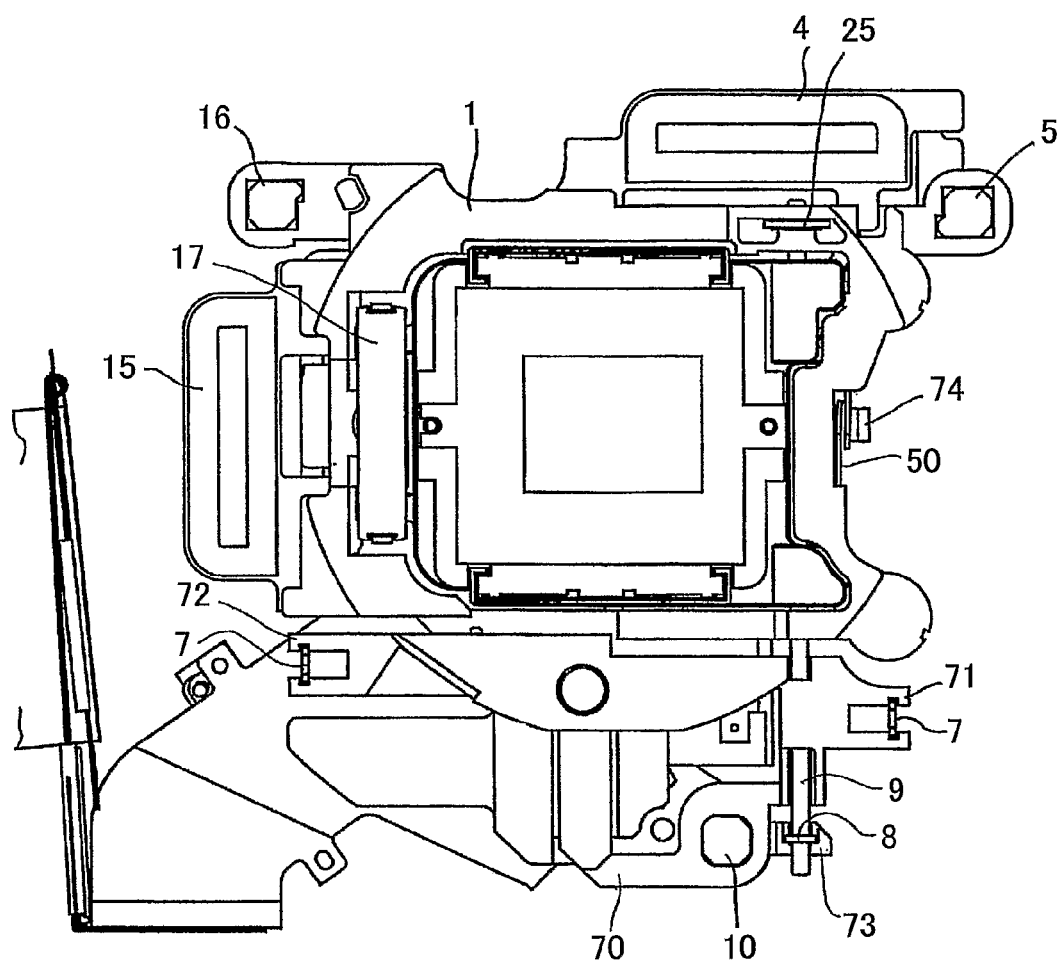
FIG. 8 is a front view of the shake correcting system in FIG. 7 without a base.
Figure 9:
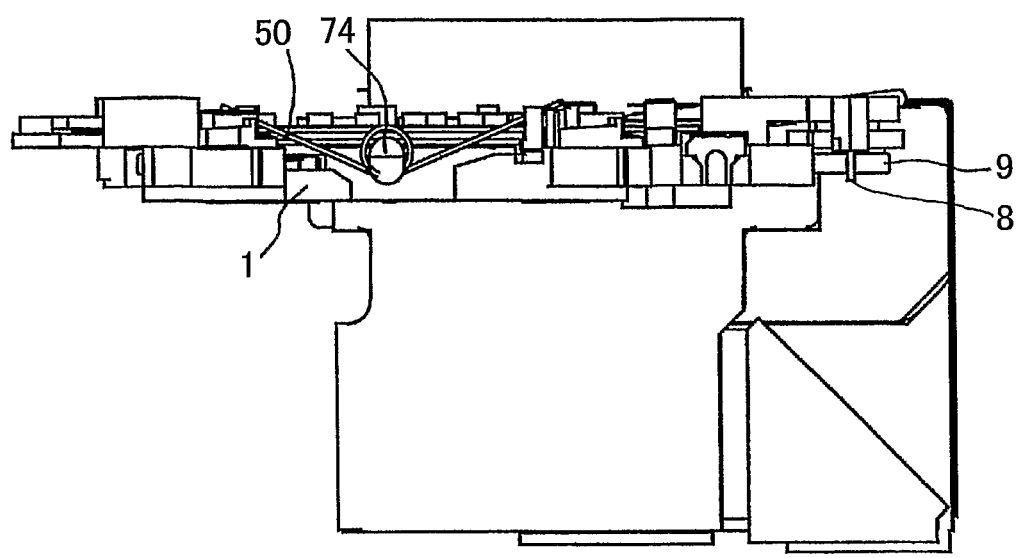
FIG. 9 is a right side view of the shake correcting system in FIG. 8.

As shown in FIG. 1 to FIG. 3, the rotation restrictor 70 is disposed in the bottom end of the movable frame 1. The rotation restrictor is a horizontally long member with slit-like shaft supports 71, 72 at both ends in a length direction and a vertical shaft hole 73 near the shaft support 71. The shaft supports 71, 72 are to receive the horizontal shafts 48, 49 fixed in the openings of the base 37 and guide the rotation restrictor 70 to move in the horizontal direction. Shaft bearings 7 (FIG. 17) are fitted in the shaft supports 71, 72 and adhered thereto by an adhesive. They are made of small plates with bearings as grooves and the horizontal shafts 48, 49 are held between the shaft bearings 7 and one side of the rotation restrictor 70. Thereby, the rotation restrictor 70 is movable along the horizontal shafts 48, 49.

Figure 16:
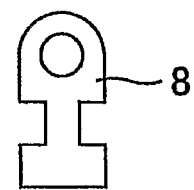
FIG. 16 shows one example of a shaft fixing element of the shake correcting system according to the first embodiment.
Figure 17:
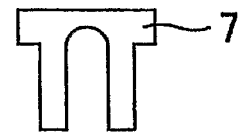
FIG. 17 shows another example of a shaft fixing element of the shake correcting system according to the first embodiment.
Figure 18:
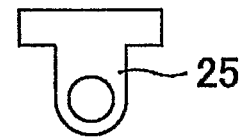
FIG. 18 shows still another example of a shaft fixing element of the shake correcting system according to the first embodiment.

A bottom end portion of the vertical intermediate shaft 9 is slidably fitted into the shaft hole 73 of the rotation restrictor 70. The bottom end of the intermediate shaft 9 is fixed to a lower corner of the movable frame 1 by a fixing member 8 which is a small plate with a hole at one end and a fitting portion with the movable frame 1 at the other end as shown in FIG. 16. The fitting portion is fitted into the fixing member 8 and adhered to the movable frame 1. The bottom end of the intermediate shaft 9 is fitted into the hole of the fixing member 8. Thus, the intermediate shaft 9 stands on the movable frame 1, inserts through the shaft hole 73 of the rotation restrictor 70, and engages with the groove on the one side of the movable frame 1, reaching the top end of the movable frame 1. The top end of the intermediate shaft 9 is fixed to the top end of the movable frame 1 with a fixing member 25 shown in FIG. 10 and FIG. 18 which is made of a small plate with a hole at one end and whose other end is adhered to the movable frame 1. The top end of the intermediate shaft 9 is fitted in the hole of the fixing member 25, thereby integrating the intermediate shaft 9 with the movable frame 1. The intermediate shaft 9 guides the movable frame 1 to move in a second direction orthogonal to the horizontal shafts 48, 49.

As shown in FIGS. 1, 2, the rotation restrictor 70 is positioned closer to the bottom end of the movable frame 1 between the movable frame 1 and the base 37 to be movable in the horizontal direction along the horizontal shafts 48, 49. Along with the horizontal movement of the rotation restrictor 70, the movable frame 1 moves in the horizontal direction along the intermediate shaft 9. Thus, the movable frame 1 can move in the horizontal and vertical directions relative to the base 37 and the outer frame 1A of the movable frame 1 and the image sensor 3 on the image sensor frame 45 can move in the horizontal and vertical directions in a plane orthogonal to the optical axis. The rotation restrictor 70, intermediate shaft 9, horizontal shafts 48, 49 constitute the rotation restricting mechanism for the rotation of the image sensor 3 around the optical axis.

In order to prevent a positional change of the movable frame 1 in the optical axis direction due to wobbles thereof, the shake correcting system includes the slide mechanism using magnetic forces. Three non-magnetic ball receiver plates 38, 39, 41 are provided on three positions of the base 37 on the side opposing the movable frame 1, and three magnetic balls 58, 59, 61 (spherical elements) in the same diameter are placed in the three receiver plates. The movable frame 1 includes ball movement restrictors 5, 16 at positions facing the ball receiver plates 38, 39, and the rotation restrictor 70 includes a ball movement restrictor 10 at a position facing the ball receiver plate 41. The ball movement restrictors are window-like openings in a larger diameter than that of the balls 58, 59, 61 and the ball movement restrictor 10 is formed on a portion (FIG. 3) of the rotation restrictor 70 downwardly projecting (away from the optical axis) from the main part of the rotation restrictor 70.

Figure 10:
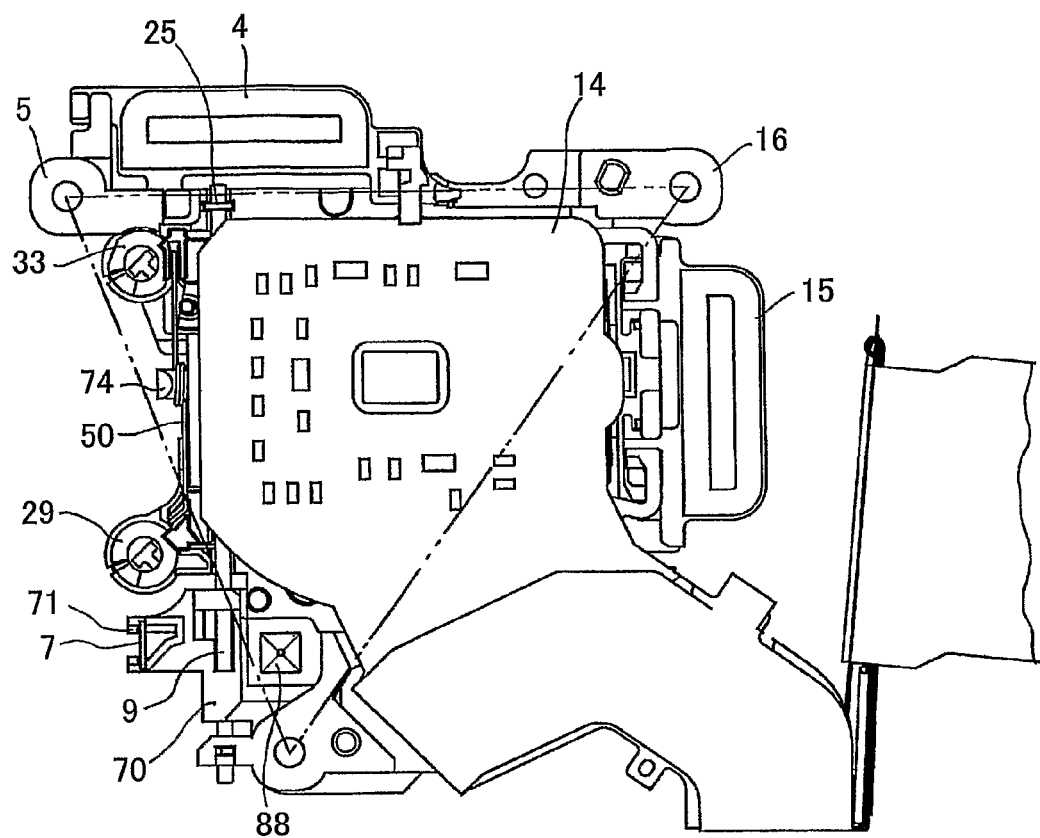
FIG. 10 is a back view of the shake correcting system according the first embodiment without a base.
Figure 11:
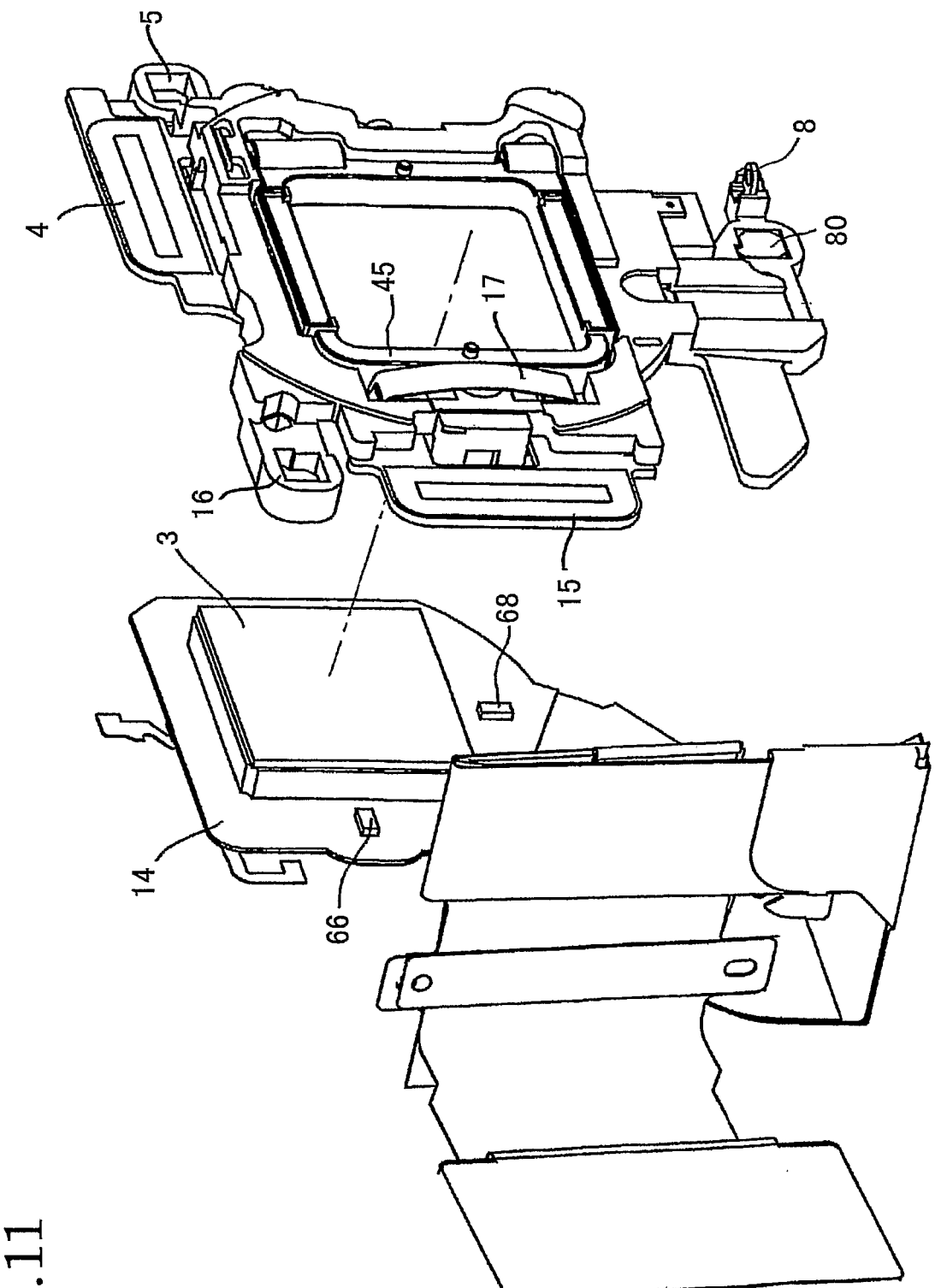
FIG. 11 is an exploded perspective view of the shake correcting system in FIG. 10 with the base removed and the image sensor separated.
Figure 12:
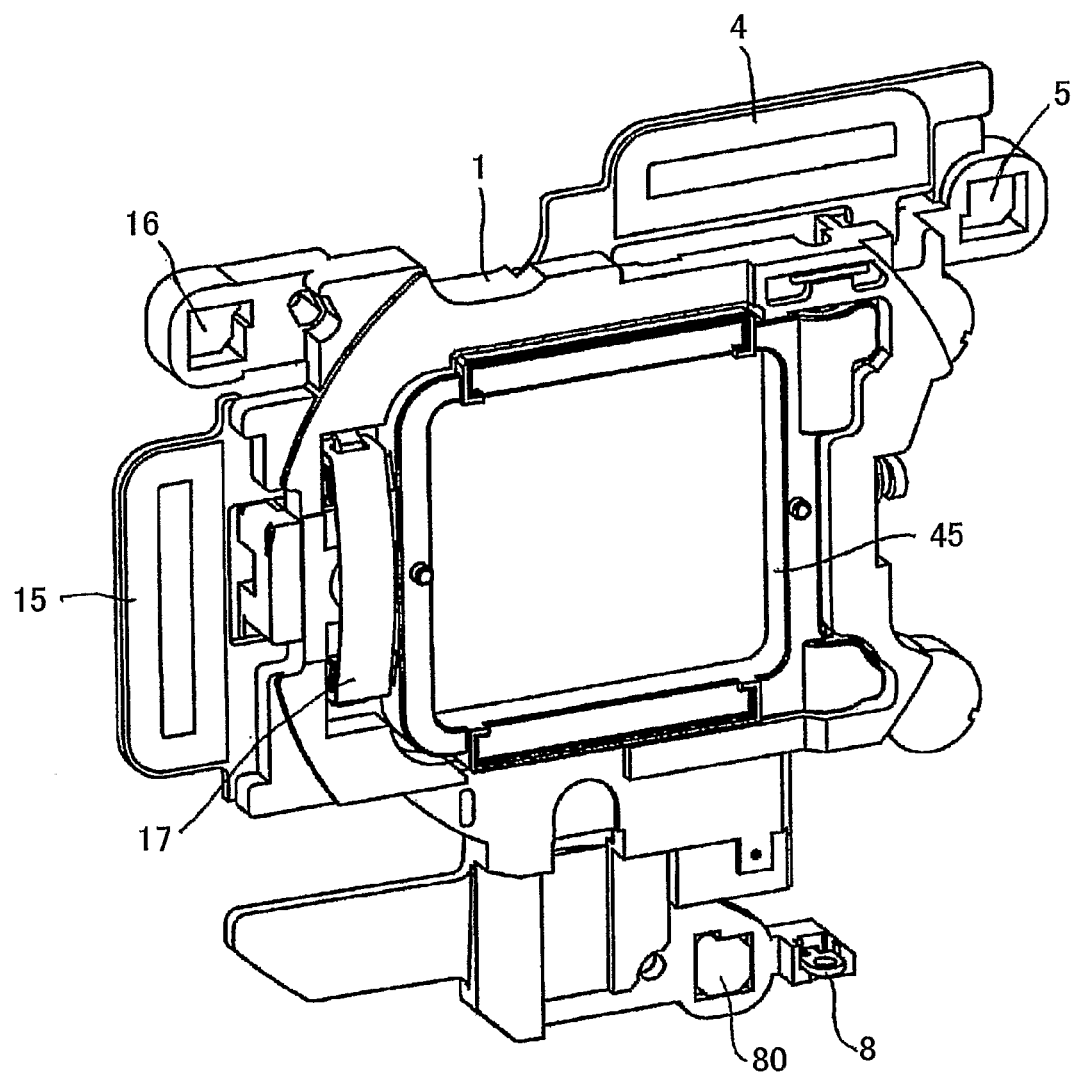
FIG. 12 is a perspective view of a back side of a movable frame of the shake correcting system according to the first embodiment.
Figure 13:
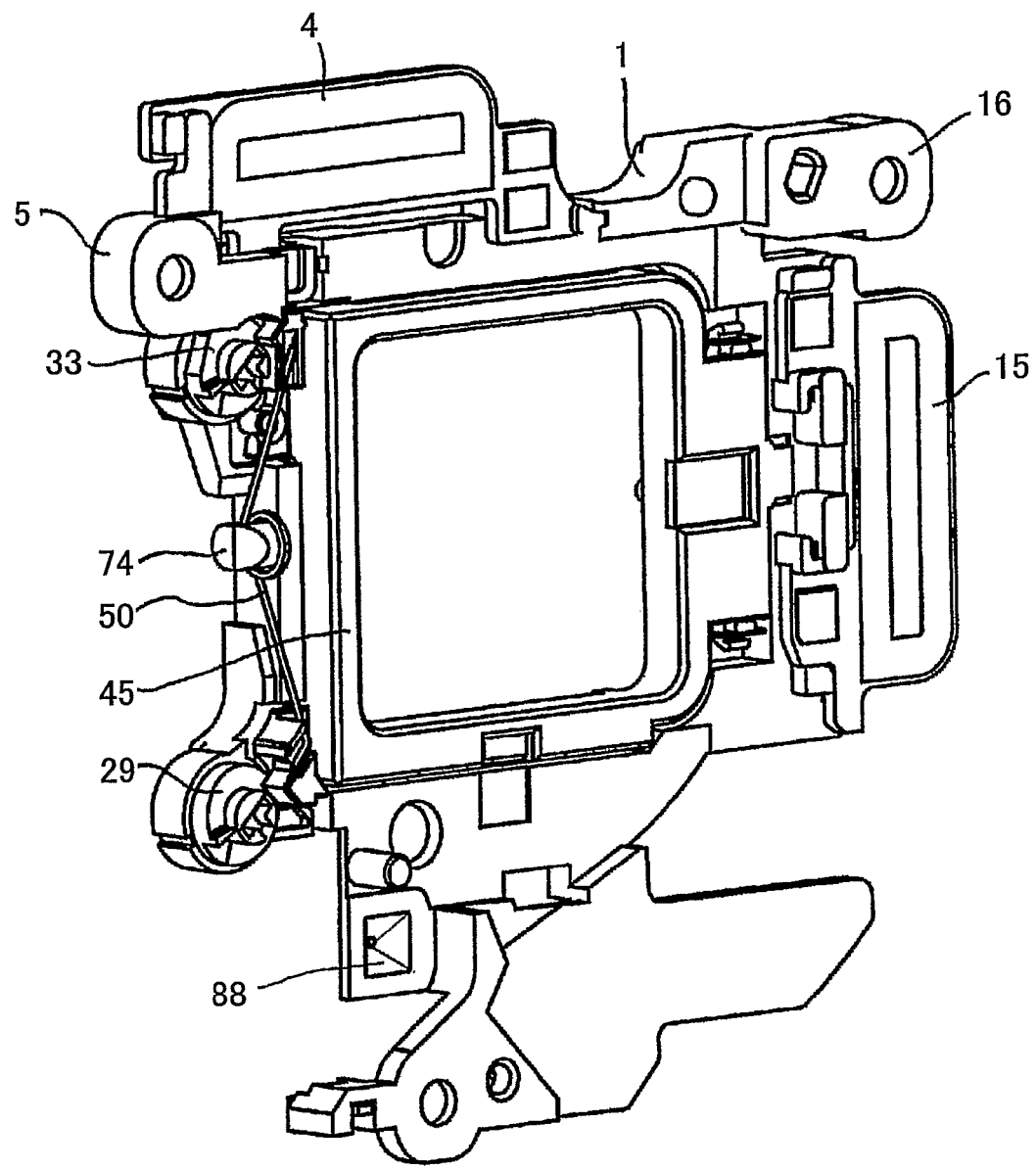
FIG. 13 is a perspective view of a front side of the movable frame in FIG. 12.

FIG. 10 shows the shake correcting system when the image sensor frame 45 and the rotation restrictor 70 are closest to each other. As shown in FIG. 10, a hole 88 in a square pyramid shape (later described) is disposed in a triangle of lines connecting the centers of the three ball movement restrictors to place the image sensor frame 45 in a predetermined position by a pin 86 of a lever latch 85 engaging with the hole 88. Providing the hole 88 in the above triangle makes the movable frame 1 stably latched. Thus, the lever latch 85, pin 86, and hole 88 constitute a latch mechanism for latching the movable unit M in the base 37. Moreover, the ball movement restrictor 10 is provided in the outwardly projecting portion of the rotation restrictor 70 in a radial direction so that an area in which the hole 88 can be disposed is increased. Although the number of the ball movement restrictors and the balls is set to 3 in the present embodiment, it can be arbitrarily set as long as it is at least three or more. With provision of four or more balls and ball movement restrictors, it is preferable that the hole 88 is disposed in a largest polygon formed by connecting lines between the centers of the restrictors.

Figure 19:
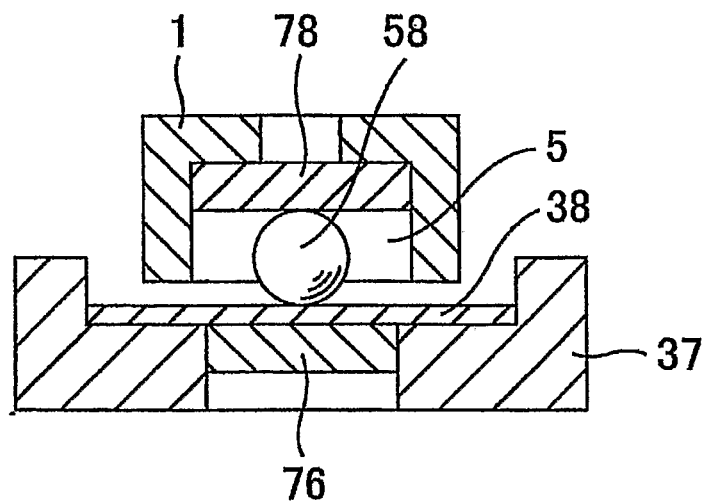
FIG. 19 is a cross sectional view of one example of a slide mechanism according to the first embodiment.
Figure 20:
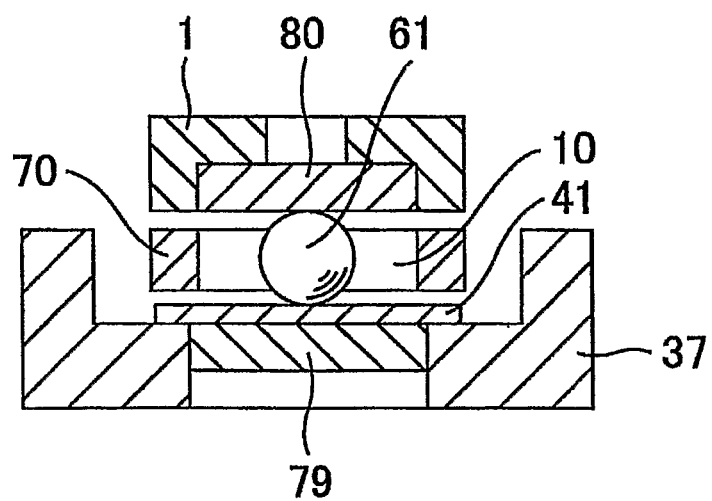
FIG. 20 is a cross sectional view of another example of the slide mechanism according to the first embodiment.

The slide mechanism by the magnetic force is described in detail with reference to FIG. 19 and FIG. 20. FIG. 19 shows an example thereof which includes the ball 58 and the ball movement restrictor 5. Similarly, the ball 59 and the ball movement restrictor 16 constitute the same mechanism. In FIG. 19 the ball receiver plate 38 is a non-magnetic plate fixed on the base 37 and includes a magnet 76 on a back side. The magnet 76 and the magnetic ball 58 generate a magnetic force. A magnetic plate 78 is fixed on the ball movement restrictor 5 of the movable frame 1 to contact with the ball 58. The magnetic force between the magnet 76 and the ball 58 and between the ball 58 and the magnetic plate 78 causes the ball 58 to constantly contact with the ball receiver plate 38 and the movable frame 1 to constantly contact with the ball 58, thereby preventing the movable frame 1 from being displaced in the optical axis direction. The rolling ball 58 allows the movable frame 1 to relatively move to the base 37 in a plane orthogonal to the optical axis. It is preferable to properly set the thickness of the non-magnetic ball receiver plate 38 in order to adjust the magnetic force of the above magnetic elements since too large magnetic force results in increasing resistance of the movable frame 1 moving to the base 37.

Next, another slide mechanism of the ball 61, the rotation restrictor 70, and the ball movement restrictor 10 is described with reference to FIG. 20. In the drawing the ball receiver plate 41 is a non-magnetic plate fixed on the base 37 and includes a magnet 79 on a back side. The magnet 79 and the magnetic ball 61 generate a magnetic force. The rotation restrictor 70 includes the ball movement restrictor 10 as a window-like opening at an opposite position to the ball receiver plate 41 which surrounds the ball 61 with an interval. Thickness of the ball movement restrictor 10 is smaller than a diameter of the ball 61 so that a part of the ball 61 protrudes from the ball movement restrictor 10. The protruding ball 61 contacts with a magnetic plate 80 embedded in the movable frame 1 and facing the ball movement restrictor 10. Magnetic force between the magnet 79 and the ball 61 and between the ball 61 and the magnetic plate 80 causes the ball 61 to constantly contact with the ball receiver plate 41 and the movable frame 1 to constantly contact with the ball 61, thereby preventing the movable frame 1 from being displaced in the optical axis direction. The rolling ball 61 allows the movable frame 1 to relatively move to the base 37 in the plane orthogonal to the optical axis. It is preferable to properly set the thickness of the ball receiver plate 41 in order to adjust the magnetic force of the above magnetic elements since too large magnetic force results in increasing resistance of the movable frame 1 moving to the base 37.

By adjusting positions of the pin 86 of the lever latch 85 and the hole 88 so that the ball 58 and the magnetic plate 78 are attracted to a position (default position in the plane orthogonal to the optical axis when blur correction function is not used) by the magnet 76 at the largest magnetic force, it is possible to reduce necessary workload for the lever latch 85 to latch the movable frame 1 at the default position.

On the base 37, a vertically long magnet 51 is fixed along the upper end of the opening while a horizontally long magnet 52 is fixed along the side end of the opening (FIG. 1). On the back yolk 40, a vertically long magnet 62 is fixed facing the magnet 51 while a horizontally long magnet 63 is fixed facing the magnet 52 (FIG. 2). The vertically long magnets 51, 62 are magnetized in the vertical direction. The horizontally long magnets 52, 63 are magnetized in the horizontal direction. The two facing magnets with different poles form a magnetic field. The back yolk 40 is a magnetic plate and functions to reduce a magnetic resistance of a magnetic circuit of the facing magnets. Also, since the magnets 51, 52 are fixed on yolks 82, 83 of the base 37, the magnetic resistance of the magnetic circuit can be reduced even with the base 37 of a non-magnetic material such as plastic.

The movable frame 1 is integrated with a vertical coil 4 placed between the magnets 51, 62. The vertical coil 4 is a conductive wire coiled in a horizontally long rectangular form in association with the magnets 51, 62 and generates a vertical thrust force. The movable frame 1 is also provided with a horizontal coil 15 placed between the magnets 52, 63. The horizontal coil 4 is a conductive wire coiled in a vertically long rectangular form in association with the magnets 52, 63 and generates a horizontal thrust force.

The movable frame 1 is moved in the vertical direction by controlling power supply to the vertical coil 4 while it is moved in the horizontal direction by controlling power supply to the horizontal coil 15. The range in which the movable frame 1 moves is limited to within a range in which the balls 58, 59, 61 are movable in the ball movement restrictors 5, 10, 16. The coils and the magnets facing them constitute a drive mechanism which supplies a bias force to the movable frame.

A vertical dipole magnet 65 (FIG. 2) for detecting a vertical position of the movable frame 1 relative to the base 37 is attached to a face of the back yolk 40 opposing the movable frame 1 while a magnetic sensor 68 (FIG. 1) for detecting a vertical position thereof is attached to the movable frame 1, facing the magnet 65. A horizontal dipole magnet 67 (FIG. 2) for detecting a horizontal position of the movable frame 1 relative to the base 37 is attached to a face of the back yolk 40 opposing the movable frame 1 while a magnetic sensor 66 (FIG. 1) for detecting a horizontal position thereof is attached to the movable frame 1, facing the magnet 67. The magnetic sensors 66, 68 are made of hall elements, for example. Power supply to the coils 4, 15 is controlled based on a shake detection signal from a not-shown acceleration sensor with the position of the movable frame 1 detected from outputs of the magnetic sensors 66, 68 taken into consideration.

The movable frame 1 comprises the outer frame 1A and the image sensor frame 45 having the image sensor mounted thereon and an inclination adjust mechanism is interposed between the outer frame 1A and the image sensor frame 45 to allow the light receiving face of the image sensor on the image sensor frame 45 to oppose the optical axis accurately. FIGS. 10 to 15 show a flexible print circuit board 14 on which the image sensor 3, magnetic sensors 66, 68 are mounted is fitted into the image sensor frame 45.

Figure 14:
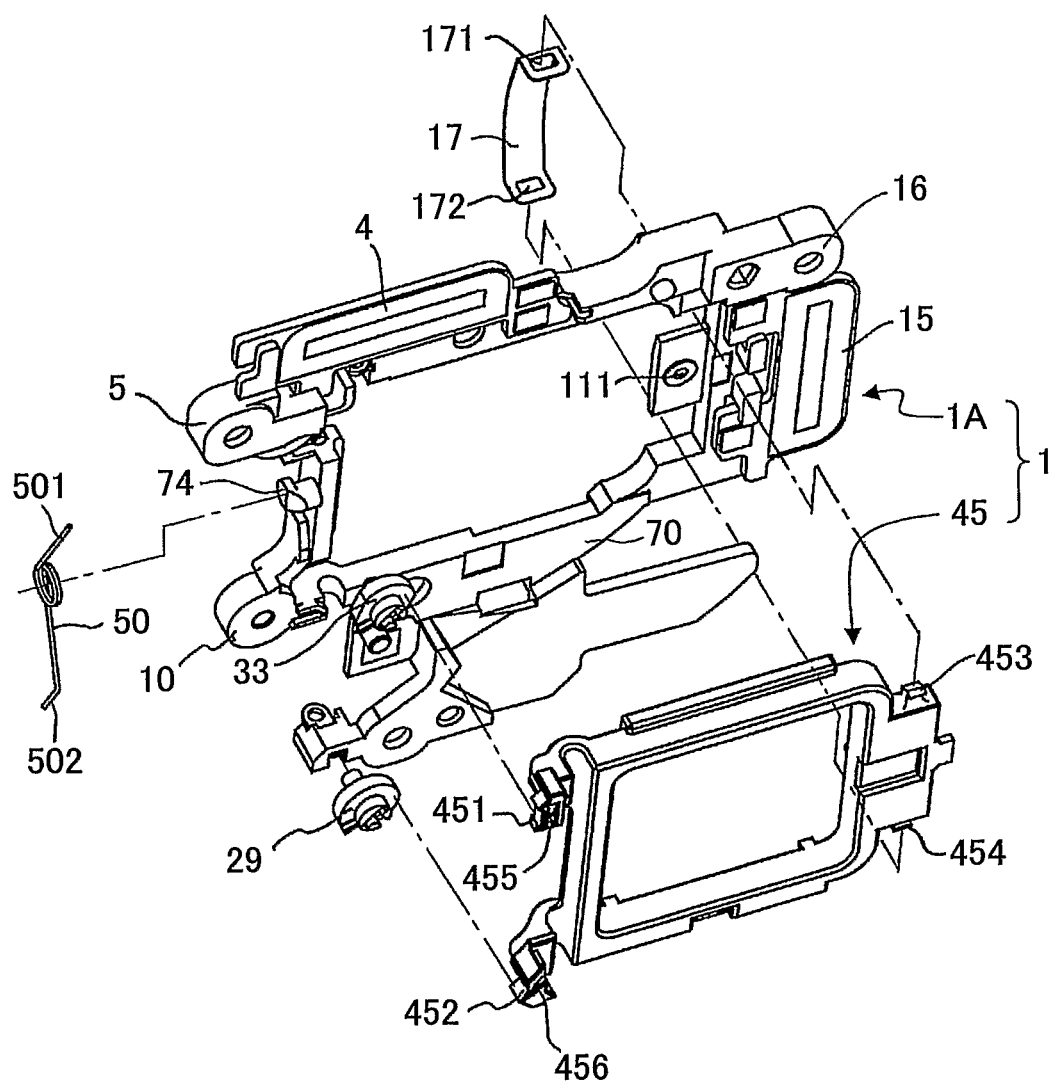
FIG. 14 is an exploded perspective view of a front side of the movable frame in FIG. 12 without the base.
Figure 15:
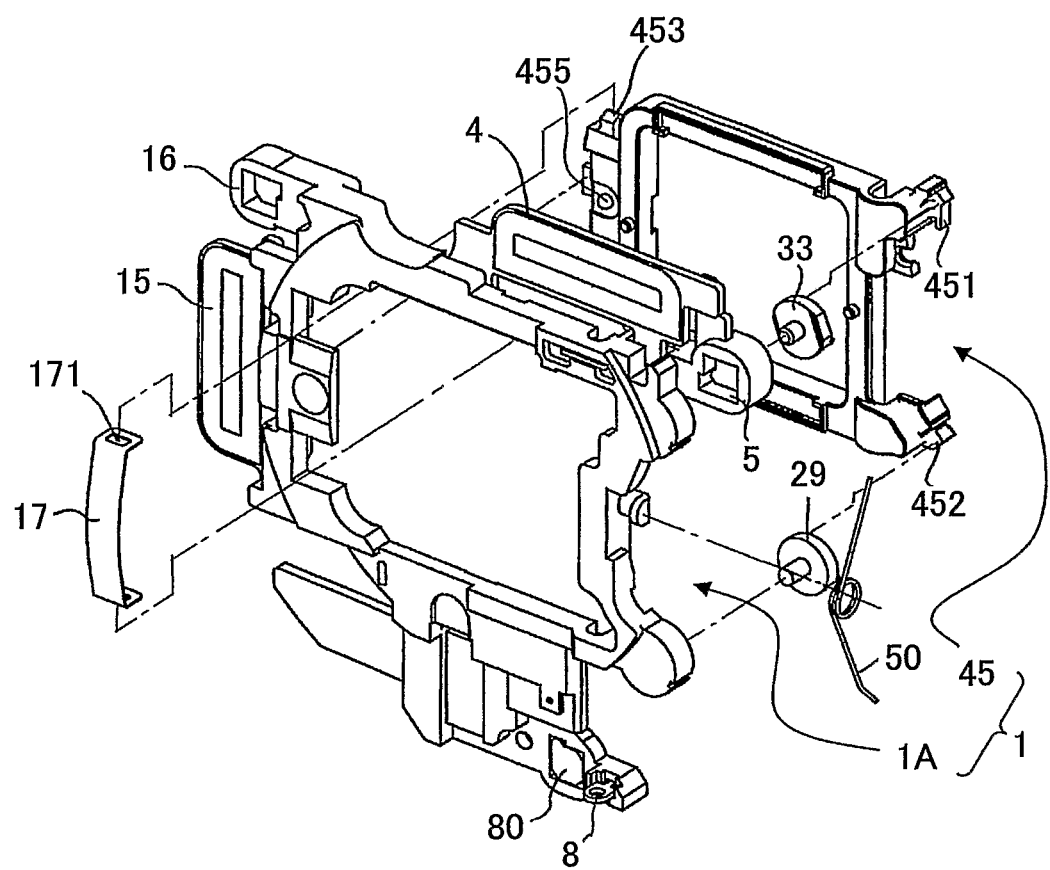
FIG. 15 is an exploded perspective view of a back side of the movable frame in FIG. 12 without the base.

As shown in FIG. 14, 15, the movable frame 1 is comprised of the image sensor frame 45, and the outer frame 1A supporting the image sensor frame 45. The image sensor frame 45 is a horizontally long rectangular frame on which the image sensor 3 is fixed. The outer frame 1A includes an opening to receive the image sensor frame 45. The image sensor frame 45 includes, between the outer frame 1A and the image sensor frame 45, a movable support portion as a support point and two adjusting portions to adjust a position of the image sensor frame 45 relative to the outer frame 1A. The structures of the movable support portion and two adjusting portions are described in the following. A protrusion 455 with a semi-spherical top end is formed as a support at one end of the image sensor frame 45 in a longitudinal direction (FIG. 15). A rectangular protrusion is integrally formed at a side of the opening of the movable frame 1 and includes a conical hole 111 to receive the protrusion 455 of the image sensor frame 45 (FIG. 14). By fitting the top end of the protrusion 455 into the hole 111, the outer frame 45 is moved with a contact point of the hole 111 and the protrusion 455 as a support point to adjust the inclination of the image sensor 3 relative to the optical axis.

One end of the outer frame 1A is pushed to the image sensor frame 45 by a blade spring 17, thereby adjusting the inclination of the image sensor 3 while maintaining the fitting of the hole 111 and the protrusion 455. Both ends of the blade spring 17 in a length direction are folded at about 90 degrees and the folded portions include holes 171, 172 which bend gradually. At one end of the outer frame 1A, a portion projecting outward is formed with protrusions 453, 454 to fit into the holes 171, 172. When the blade spring 17 is vertically (longitudinal direction) inserted into one side of the opening of the outer frame 1A, the protrusions 453, 454 of the image sensor frame 45 are fitted into the holes 171, 172. The blade spring 17 is provided to maintain the engagement of the hole 111 and the protrusion 455 by holding the projecting portion of the outer frame 1A with the image sensor frame 45.

The image sensor frame 45 integrally includes an extending arm and cam followers 451, 452 at ends of the arm on the opposite side to the protrusions 455 side. The cam followers 451, 452 are brought into contact with cam faces of cam elements 33, 29 attached to the outer frame 1A by a bias force of a later-described spring 50. Contact portions of the cam followers 451, 452 and the cam faces are two adjusting portions for the movable frame 1. The cam elements 33, 29 are rotatably mounted around a shaft hole of a face opposite to the image sensor frame 45 and their rotary positions are adjustable arbitrarily. They include spiral cam faces, opposite to the image sensor frame 45, whose height continuously changes in the axial direction.

The outer frame 1A is integrally formed with a spring hook extending outwards and hooking a spring 50 at end of the cam elements' side and about the center of the cam elements 33, 29 in the vertical direction. The spring 50 is a linear spring whose center is a wound portion which is hooked by the spring hook 74. One end 501 of the spring 50 extends straight and the other end 502 is diagonally bent in a plane parallel to the light receiving face of the image sensor 3. The image sensor frame 45 includes grooves 455, 456 receiving the one and the other ends of the spring 50, respectively on the opposite side to the side on which the cam followers 451, 452 are formed. Accordingly, the cam followers' side of the image sensor frame 45 is pushed to the movable frame 1 by the bias force of the spring 50 to be made in contact with the cam faces of the cam elements 33, 29, thereby restricting the movement of the image sensor frame 45.

Thus, lines connecting a contact of the hole 111 and the protrusion 455 and a contact of the cam followers 451, 452 and the cam elements 33, 29 form an isosceles triangle (FIG. 10). By adjusting the rotary positions of the cam elements 33, 29 with a driver or the like, the inclination of the outer frame 1A and the image sensor 3 in the image sensor frame 45 can be adjusted with the contact of the hole 111 and the protrusion 455 as a support point. Adjusting one of the cam elements 33, 29 makes it possible to adjust vertical inclination of the image sensor frame 45 while adjusting both of the cam elements 33, 29 in the same direction makes it possible to adjust horizontal inclination of the image sensor frame 45. The cam elements 33, 29 are adjusted so that the light receiving face of the image sensor 3 is to face the optical axis accurately. Thus, inclination of the light receiving face of the image sensor can be finely adjusted by the two adjusting portions of the inclination adjust mechanism Further, the shake correcting system of the present embodiment comprises a latch mechanism for the movable unit to maintain the center position of the image sensor frame 45, which will be described in the following. When the movable frame 1 is largely displaced from the center position at power-on of the imaging device or the shake correcting system, it may need to be largely moved in some direction. In such a case, quick shake correction is not feasible.

In FIG. 1 to FIG. 10, a lever latch 85 is provided on a bottom portion of the base 37 and moves in cooperation with a not-shown driver system including motors or the like. By operating the driver system, the lever latch 85 is moved closer/away to/from the base 37. The lever latch 85 diagonally stands in parallel to the movable frame 1 and includes a pin 86 at top end protruding to the movable frame 1. A hole 88 in a square pyramid formed in the movable frame 1 faces and receives the pin 86. The hole 88 has a size equal to or larger than a movement area of the movable frame 1 so that it is able to receive the pin 86 irrespective of the position of the movable frame 1.

At power-off of the imaging device or the shake correcting system, the lever latch 85 is moved by the driver system to the base 37 (to a subject in the optical axis direction). This latch operation makes the pin 86 fitted into the hole 88. Component force from the pin 86's contacting the slope face of the hole 88 and moving to the bottom moves the movable frame 1 to a predetermined position and stops it there, that is, the center of the movement area. In this state the movable frame 1 is latched by the lever latch 85 and does not move. Note that concurrently with or before the latch operation, the image sensor frame can be controlled to return to the default position by flowing electric current into the coil.

Meanwhile, at power-on of the imaging device or the shake correcting system, the lever latch 85 is moved away from the base 37 (away from a subject in the optical axis direction) by the driver system. This latch release operation releases the fitting of the pin 86 and the hole 88 and makes the movable frame 1 movable.

In the shake correcting system according to the present embodiment, friction occurring from the movement of the movable unit M is mostly rolling friction of the rolling balls of the slide mechanism and only a part thereof is sliding friction of the rotation restrictor 70's interfering with the horizontal shafts 48, 49 and the intermediate shaft 9. In general, the sliding friction is smaller than the rolling friction so that the movable unit M can be moved more smoothly by the sliding mechanism than that in the prior art system. Furthermore, since the interference of the rotation restrictor 70 with the horizontal shafts 48, 49 and the intermediate shaft 9 occurs only when the rotary restricting mechanism restricts the rotation of the movable unit M, power loss due to the friction can be small. Accordingly, it is possible to reduce workload for moving the movable frame 1.

Thus, the shake correcting system according to the present embodiment is configured that the movable frame 1 can be smoothly moved by the balls with only resistance of the rolling balls and prevented from wobbling by the magnetic force acting on the balls. Since the rotation preventing mechanism and slide mechanism for the movable frame 1 are separately provided, it is possible to reduce workload needed for moving the movable frame 1 and reduce power consumption of the shake correcting system, and elongate the longevity of butteries.

Further, the shake correcting system according to the present embodiment is configured to include the slide mechanism which attracts the base, balls (spherical elements), and movable unit onto each other by magnetic force, so as to stably maintain the position of the image sensor in the optical axis direction.

Further, providing the slide mechanism in a main portion of the rotation restrictor enables reduction in size of the outwardly expanding portion thereof in the optical axis direction and downsizing of the shake correcting system as well as downsizing of the lens barrel, imaging device, and hand-held data terminal incorporating such a shake correcting system.

Second Embodiment

Next, the second embodiment of the present invention is described with reference to FIG. 22 to FIG. 26. A difference between the first and second embodiments is in the structure of the ball movement restrictor 10. In the first embodiment the ball movement restrictor is provided in the expanding portion, a lower position than the main portion of the restrictor 70, and the ball receiver plate 41 is positioned in association with the ball movement restrictors 10. This is to stably support the movable frame 1 by keeping the three portions of the slide mechanism away from each other. However, such a configuration has a disadvantage of increasing the size of the image correcting system in the optical axis direction. The second embodiment is for resolving the disadvantage. The rest of the structure is mostly the same as that of the first embodiment and the same components and functions are given the same numeric codes, so that a description thereof will be omitted.

Figure 22:
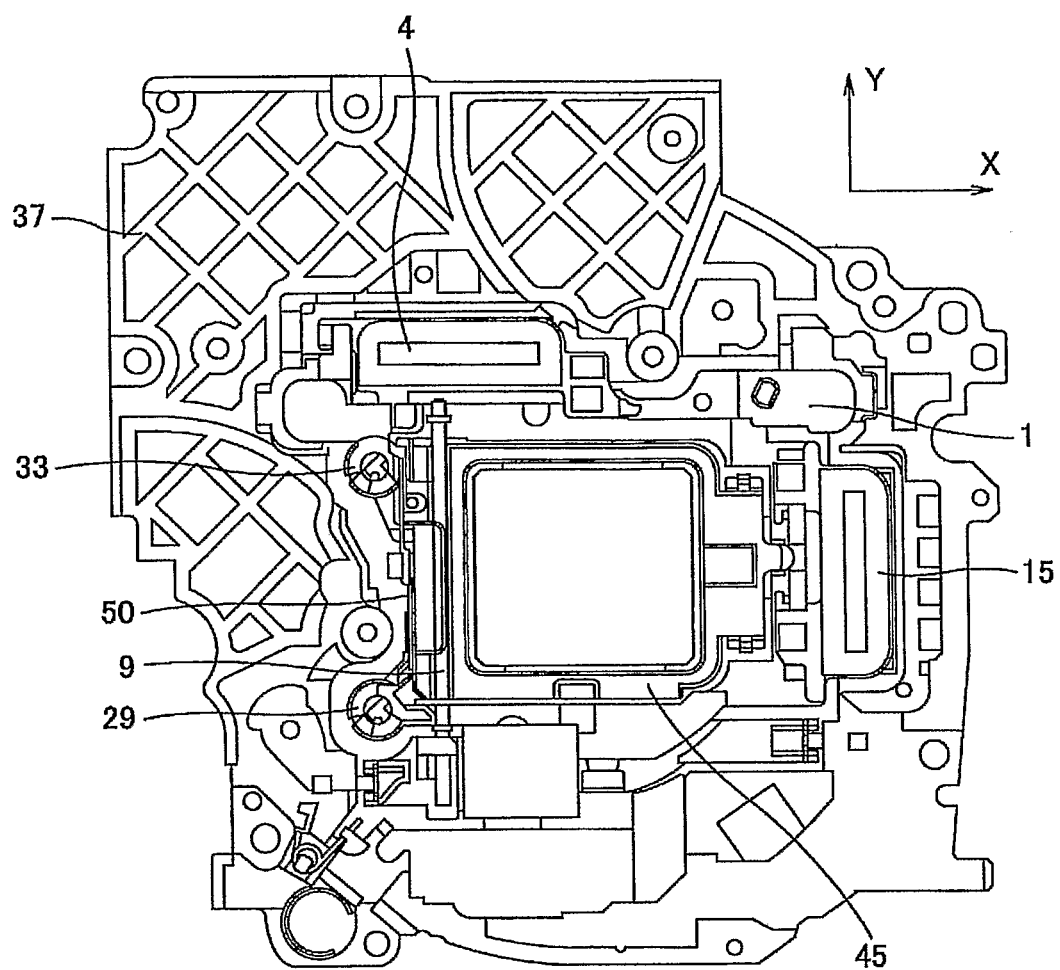
FIG. 22 is a back view of a shake correcting system without a back yolk according to a second embodiment of the present invention.
Figure 23:
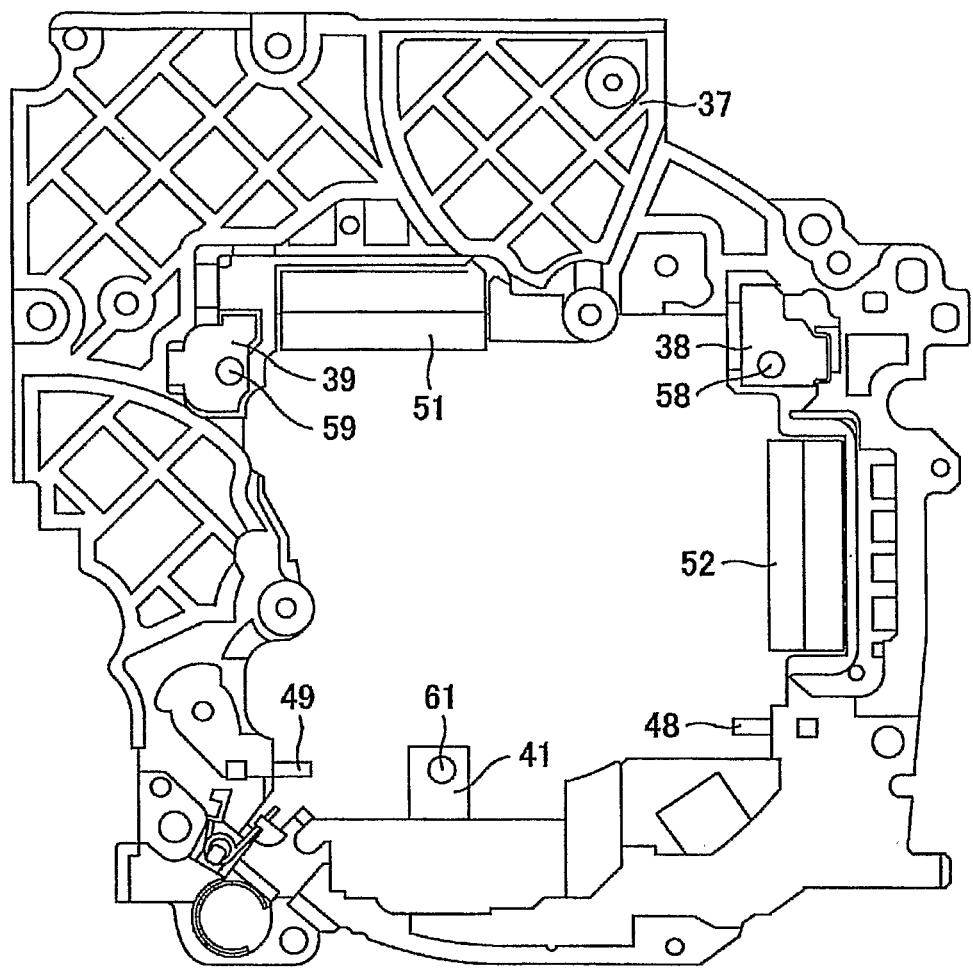
FIG. 23 is a back view of a base of the second embodiment.
Figure 24:
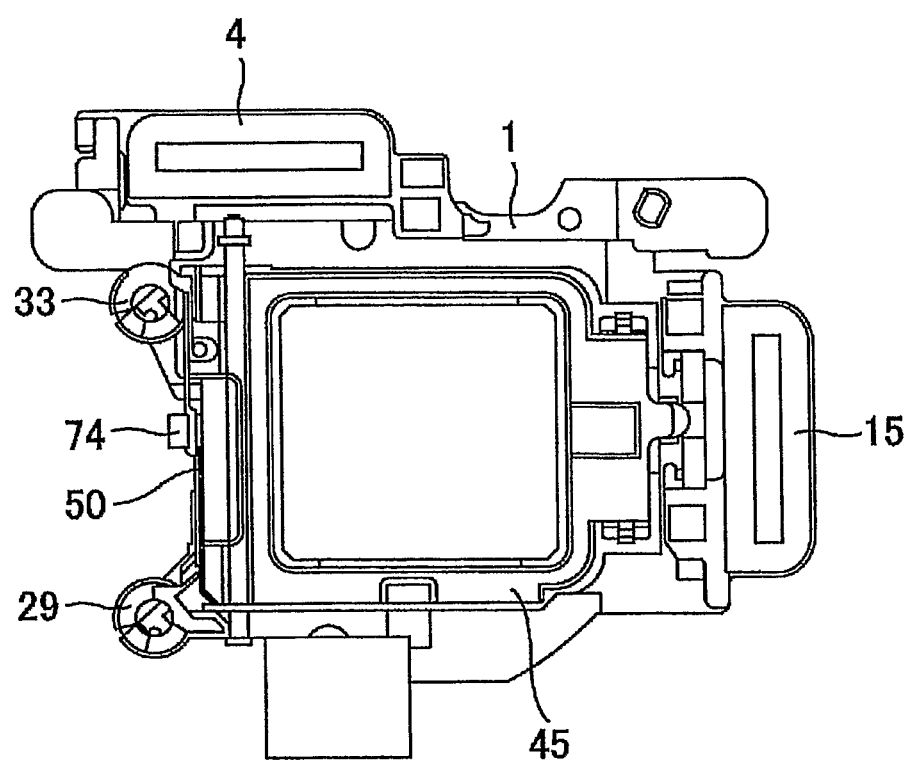
FIG. 24 is a back view of the shake correcting system without the base according to the second embodiment.
Figure 25:
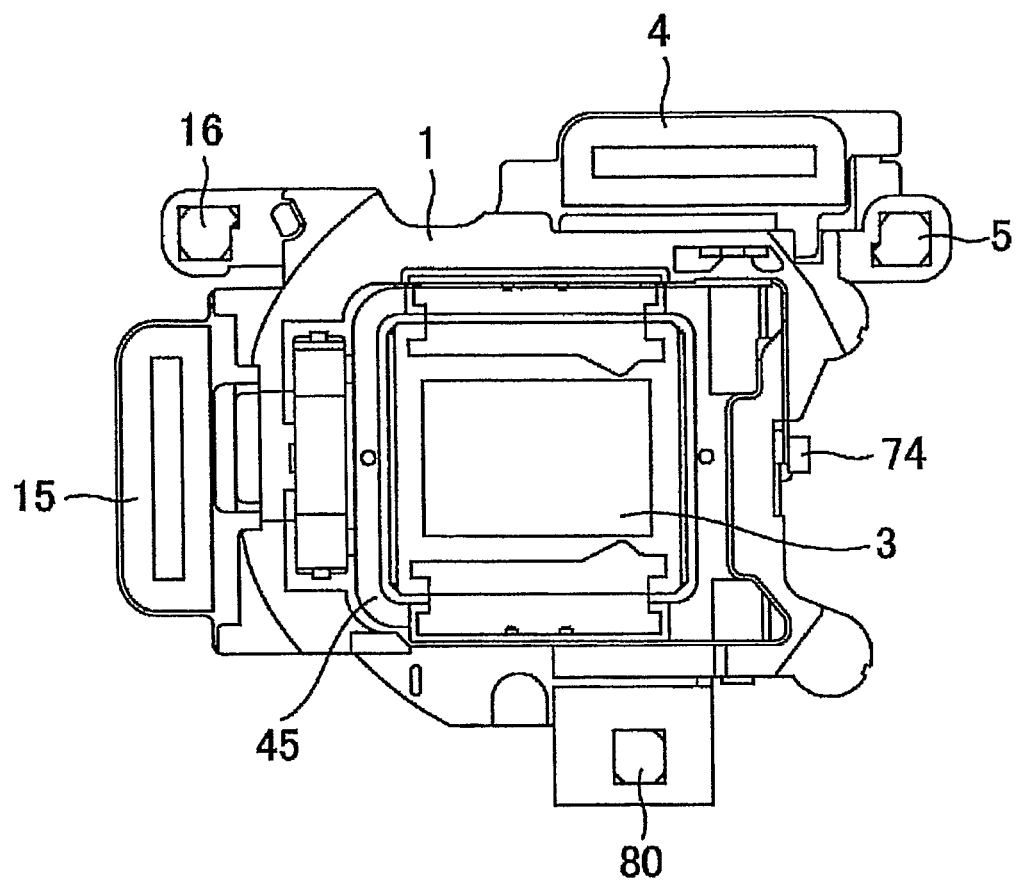
FIG. 25 is a front view of the shake correcting system without the base according to the second embodiment.
Figure 26:
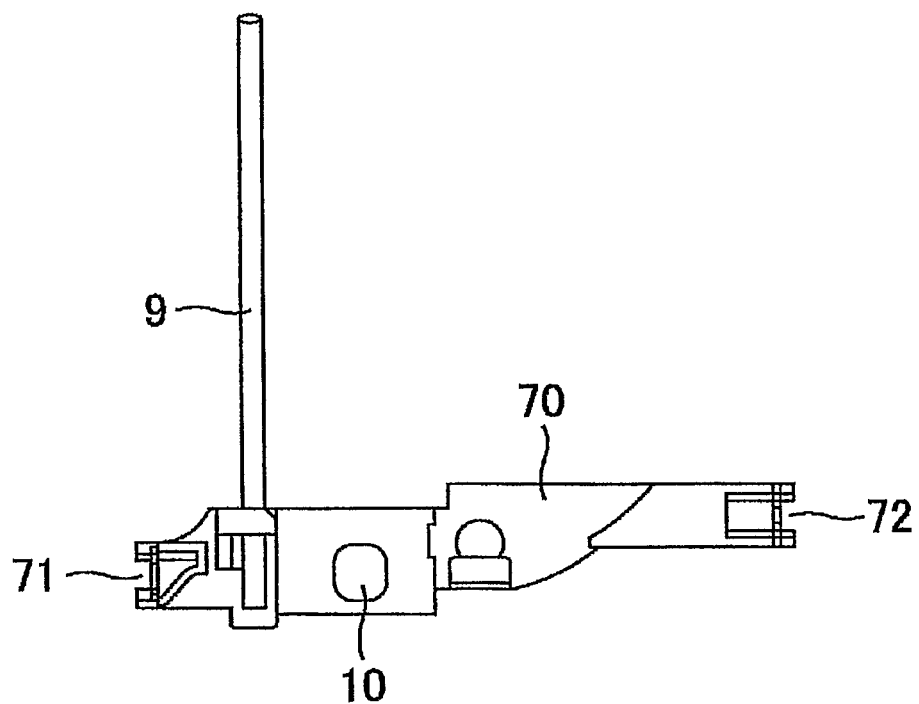
FIG. 26 is a back view of a rotation restrictor and an intermediate shaft according to the second embodiment.

In the second embodiment, the rotation restrictor 70 is made of a horizontally long main portion including a window-like through hole as the ball movement restrictor 10 instead of the expanding portion of the first embodiment, as shown in FIG. 26. The rotation restrictor 70 includes shaft supports 71, 72 receiving horizontal shafts 48, 49 at both ends and integrally holds the bottom end of the intermediate shaft 9 near the shaft support 71, as in the first embodiment. A magnetic ball 61 is provided in the ball movement restrictor 10, a base 37 includes, in a position opposing to the restrictor 10, a receiver plate 41 to which a magnet is fixed on a back side, and the movable frame 1 includes a magnetic plate 80 in a position facing the restrictor 10. Thus, the ball 61 and the receiver plate 41 and the ball 61 and the magnetic plate 80 are attracted to each other by the magnetic force of the magnet, thereby preventing unstable motion of the base 37 and the movable frame 1 in the optical axis direction. Moreover, the area in which the movable frame 1 is moved is restricted. In FIG. 22 a vertical direction is indicated by the arrow Y while a horizontal direction is indicated by the arrow X.

According to the second embodiment, provision of the ball movement restrictor 10 in the main portion of the rotation restrictor 70 instead of the one in the expanding portion in outward radial direction contributes to further downsizing the shake correcting system.

Meanwhile, for the purpose of downsizing an imaging device or else including a shake correcting system, generally an image sensor is electrically connected via a flexible print circuit board (hereinafter, FPC) with a controller processing image data from the image sensor. FPC is advantageous in downsizing the device since it can be disposed even in a very small space or a curved space. FPC is generally connected with the image sensor at one end and connected with the controller at the other end, and folded in-between. However, for correcting shakes of the device by moving the image sensor, rotary forces around the optical axis and in a direction orthogonal to the optical axis are applied to the image sensor and the movable frame due to reaction force of the FPC along with the movement of the image sensor. The movable frame is given a predetermined looseness with the other components such as the guide elements.

Figure 46:
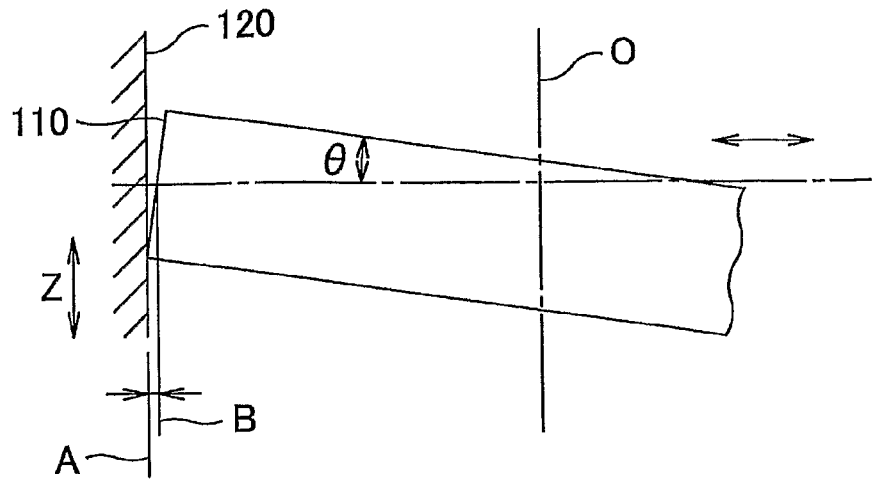
FIG. 46 shows an example of a contact state of a base and a movable frame when the image sensor does not appropriately contact with the base.

Therefore, when the movable frame is near the limit of a predetermined movement area, reaction force of the FPC may rotate the movable frame in the vertical direction relative to the optical axis, causing the movable frame not to contact with the base in the right position, as shown in FIG. 46. FIG. 46 shows the movable frame in rotation around an axis orthogonal to the optical axis O when a planar face 110 thereof is supposed to contact with a planar face 120 of the base. The moving direction of the movable frame is a perpendicular direction relative to the face 120 as indicated by the arrows. When the reaction force of the FPC rotates the movable frame by an angle θ as shown in FIG. 46, one end corner of the movable frame touches the face 120. As a result, an actual contact position B of the movable frame is shifted from a designed contact position A and an actual moving area thereof is different from a designed moving area. This causes an error in detection of a position detector and in data sent to the controller, resulting in decreasing accuracy of the shake correction.

Further, due to the rotary force on the movable frame around the optical axis, a large rotary moment may be applied to the guide shafts supporting the movable frame when the movable frame contacts with the base, resulting in a deformation of the shafts and shaft bearings over time, an increase in friction resistance, and a decrease in the shake correction accuracy.

There is a known shake correction system by moving a lens for restricting rotation of a lens moving frame (disclosed in Japanese Laid-open Patent Publication No. 2008-191266 (Reference 4), for example). Such a system does not need to consider the reaction force of the FPC since unlike the image sensor, the lens may move dragging coil lines of an actuator but not dragging several dozens of signal lines of the FPC. It is not hard to add a rotation restricting structure in such a system. However, the shake correction system by moving the image sensor according to the present invention needs to include a devised rotation restricting structure different from the one in Reference 4, which will be described in a third embodiment.

Third Embodiment

Figure 27:
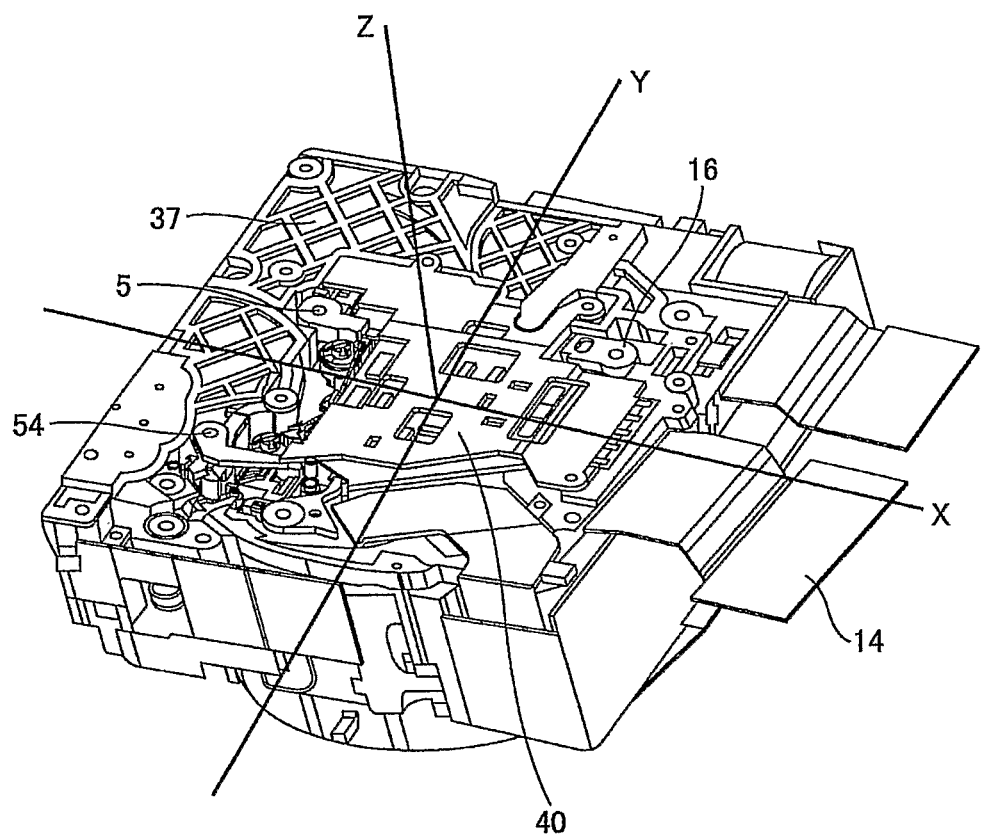
FIG. 27 is a perspective back view of a shake correcting system according to a third embodiment of the present invention.

A shake correction system according to the third embodiment comprises a stopper (tilt prevention mechanism) to reduce or eliminate rotary force on the image sensor, and is described in detail with reference to FIGS. 27 to 30. In FIG. 27, Z axis is the optical axis of an optical imaging system, and X and Y axes are orthogonal to Z axis and to each other. X axis is a moving direction of the horizontal shafts 48, 49 of the first embodiment and Y axis is a moving direction of the intermediate shaft 9. A position in which the center of the X, Y axes intersects with the Z axis as the optical axis is an original position of the movable frame 1 for shake correction.

Figure 28:
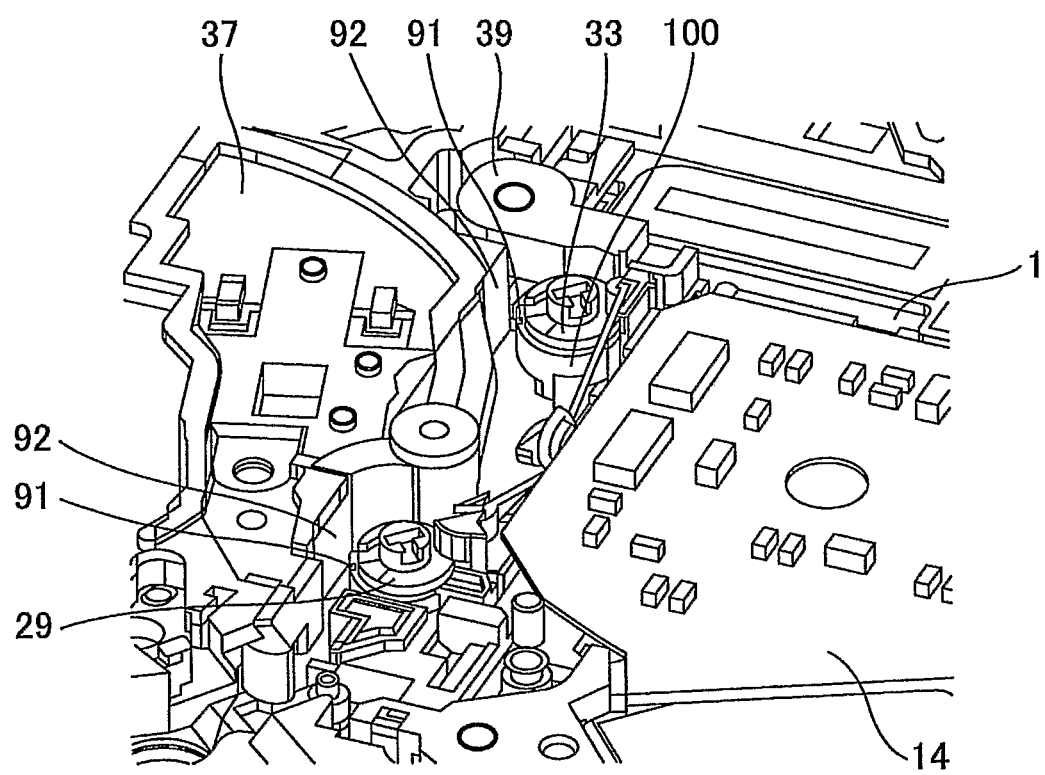
FIG. 28 is an enlarged perspective back view of an essential part of the shake correcting system according to the third embodiment.
Figure 29:
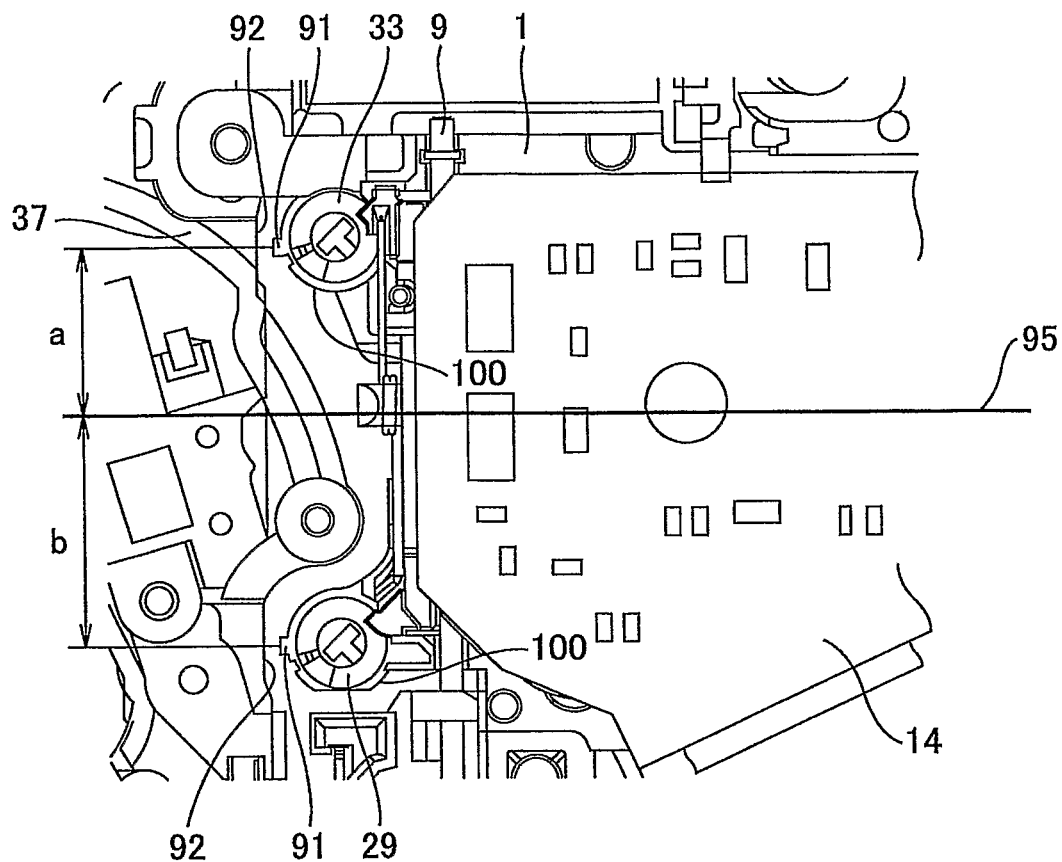
FIG. 29 is an enlarged back view of the essential part in FIG. 28.
Figure 30:
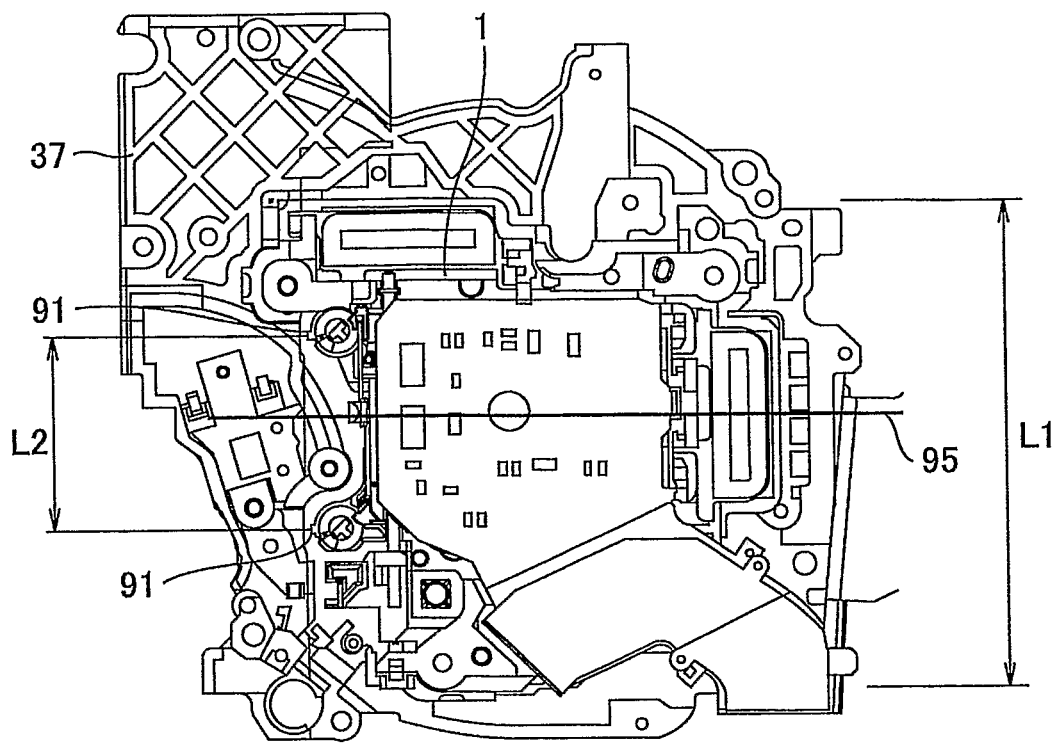
FIG. 30 is a back view of the shake correcting system according to the third embodiment.

In FIGS. 28 to 30, the movable frame 1 integrally holding the image sensor on the image sensor frame includes two protrusions 91 on a base 100 of the cam elements 29, 33. The protrusions 91 face planar walls 92 of the base 37 with a predetermined interval. The protrusions 91 and walls 92 constitute stoppers which limit movement of the movable frame 1 in one side of the X axis direction. As shown in FIG. 29, the two stoppers are disposed on both sides of a line of action 95 and with substantially the same distances a, b from the line of action 95 of a horizontal driving force of the horizontal magnets 52, 63 and the horizontal coils 15. The protrusions 91 are bent in the optical axis direction to point-contact with the walls 92.

According to the third embodiment, when the movable frame 1 reaches the limit in one side of the X axis direction, the two protrusions 91 contact with the walls 92 to restrict the movement of the movable frame 1. Due to the reaction force of the FPC 14, rotary moment around X or Y axis (perpendicular to the optical axis) occurs in the movable frame 1 and the image sensor along with the movement of the movable frame 1. However, since the protrusions 91 is bent in the optical axis direction, a change in the facing position of the protrusions 91 relative to the walls 92 does not affect a contact position thereof in the X axis direction. Thus, it is possible to prevent an error in detection of the position of the movable frame 1 and transmission of erroneous data to the controller, improving the shake correction accuracy. Note that the position of the movable frame is detected by a hall element, for example, to control the moving amount of the movable frame 1 according to a detection signal therefrom for shake correction.

Figure 47A:
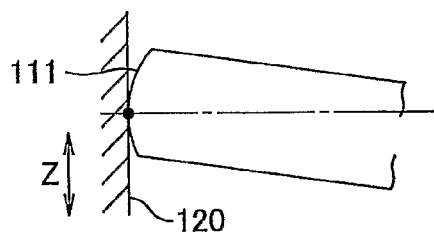
FIGS. 47A, 47B show examples of a contact state of the base and the movable frame when the image sensor appropriately contacts with the base.
Figure 47B:
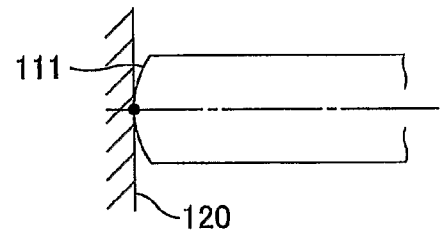

FIGS. 47A, 47B show a contact state of a protrusion 111 and a wall 120 when they appropriately contact with each other. In FIG. 47A, 47B, Z axis direction is a vertical direction and the protrusion 111 is a circular arc in the Z axis direction and in contact with the wall 120. In FIG. 47A the movable frame 1 is in rotation around a direction orthogonal to the Z axis direction while in FIG. 47B it is not in rotation. Thus, it can be seen that the contact position of the protrusion 111 and wall 120 does not change irrespective of the rotation of the movable frame. Accordingly, it is able to prevent the movable frame from moving outside the designed moving area and prevent a decrease in the shake correction accuracy.

According to the third embodiment as shown in FIGS. 28 to 30, the protrusions 91 are disposed on both sides of the line of action 95 of the horizontal driving force with substantially the same distances from the line of action 95 to concurrently hit the walls 92 and restrict the position of the movable frame 1. This can reduce the rotation amount of the movable frame 1, leading to reducing an error in the positional detection thereof and improving the shake correction accuracy.

Further, it is preferable to arrange the protrusions 91 to satisfy a relation, $L2 \geq \frac{1}{4}$ of L1, where L1 is a total length of the movable frame 1 in the Y axis direction and L2 is a distance between centers of the two protrusions 91 in the Y axis direction. Setting the distance between the protrusions to a value $\frac{1}{4}$ of L1 or more makes it possible to enhance the above advantageous effects resulting from the provision of the plural protrusions.

Note that FIGS. 28 to 30 only show the stoppers on one side of the X axis direction but the shake correcting system according to the present embodiment comprises other stoppers with the same configuration on the other side of the X axis direction.

Figure 31:
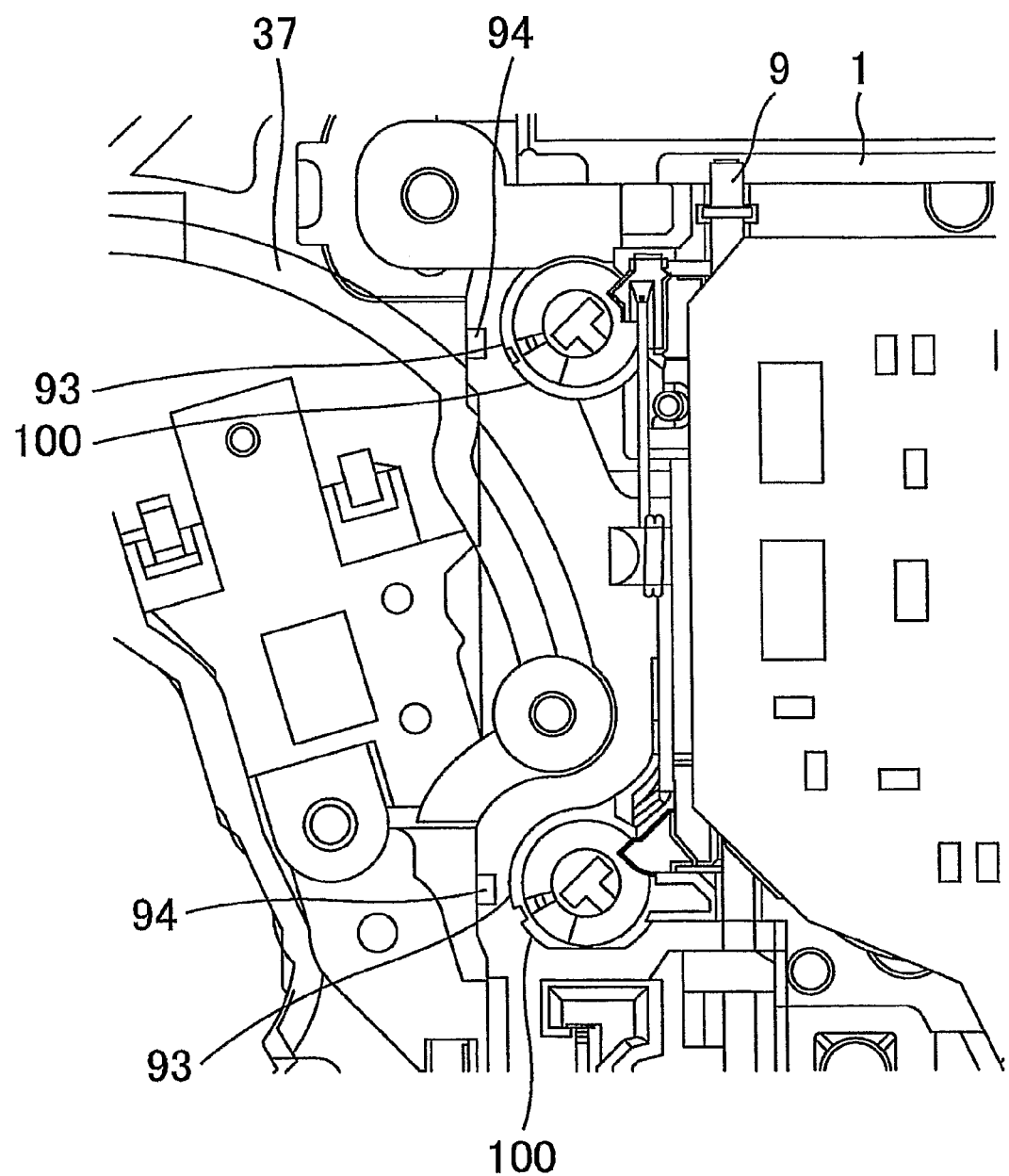
FIG. 31 is a back view of an essential part of a modified shake correcting system according to the third embodiment.
Figure 32:
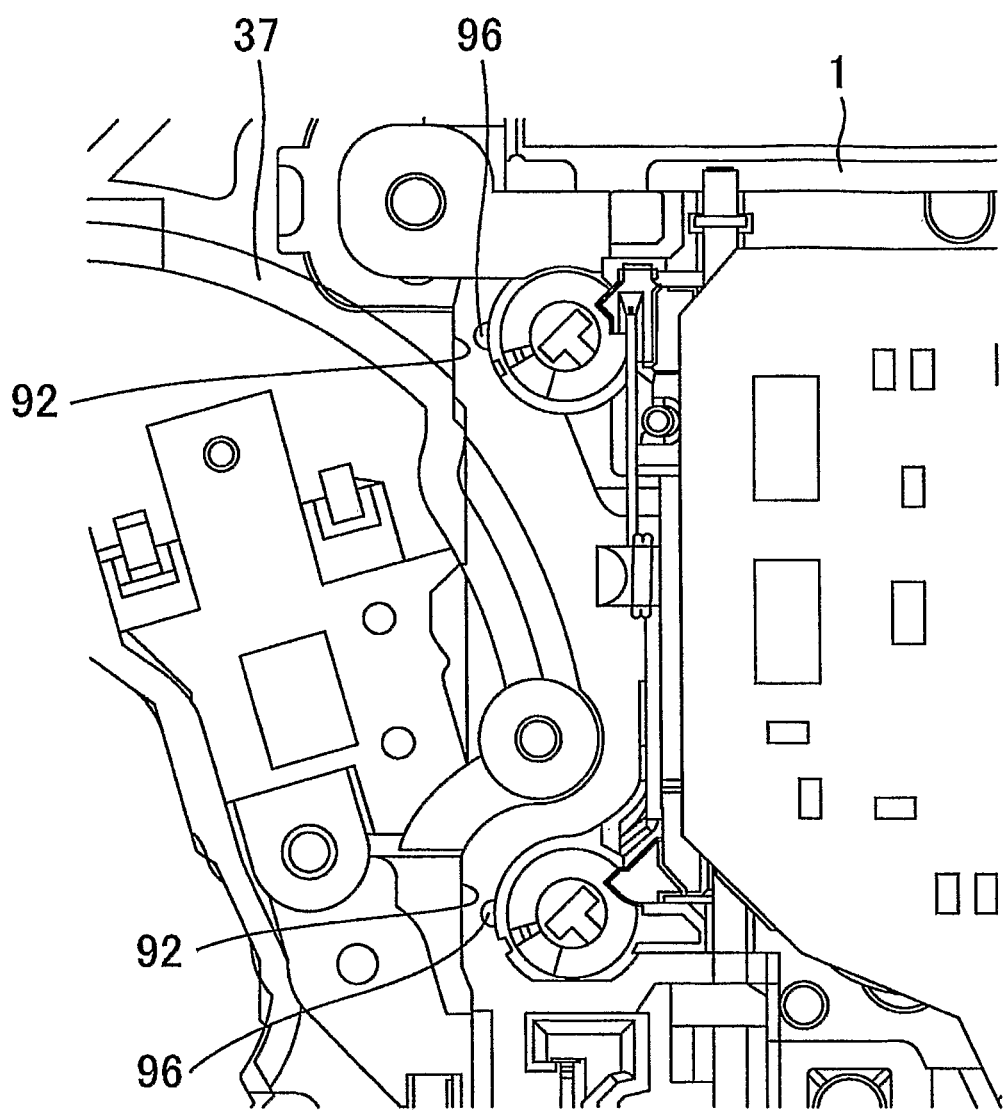
FIG. 32 is an enlarged back view of another essential part according to the third embodiment.
Figure 33:
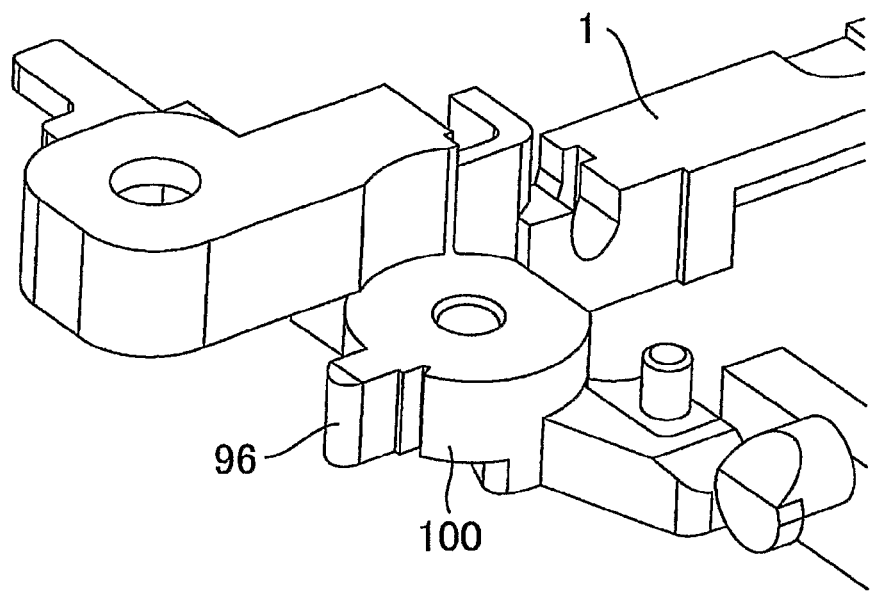
FIG. 33 is a perspective view of the essential part in FIG. 32.
Figure 34:
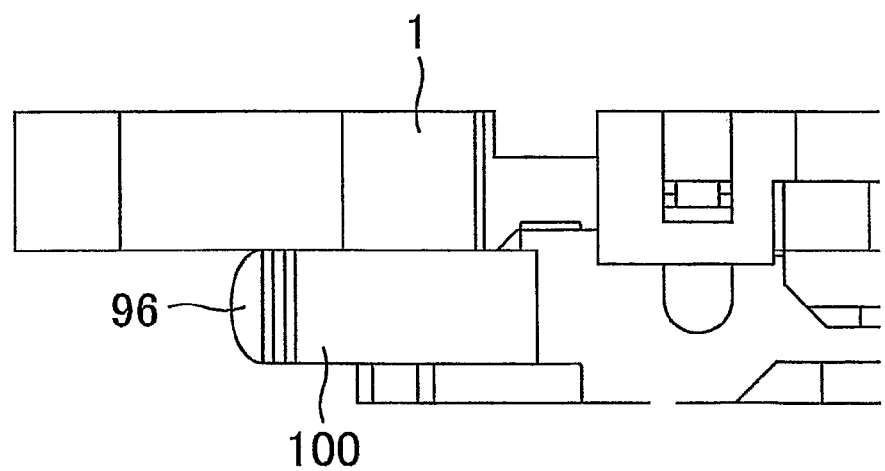
FIG. 34 is a side view of the essential part in FIG. 33.
Figure 35:
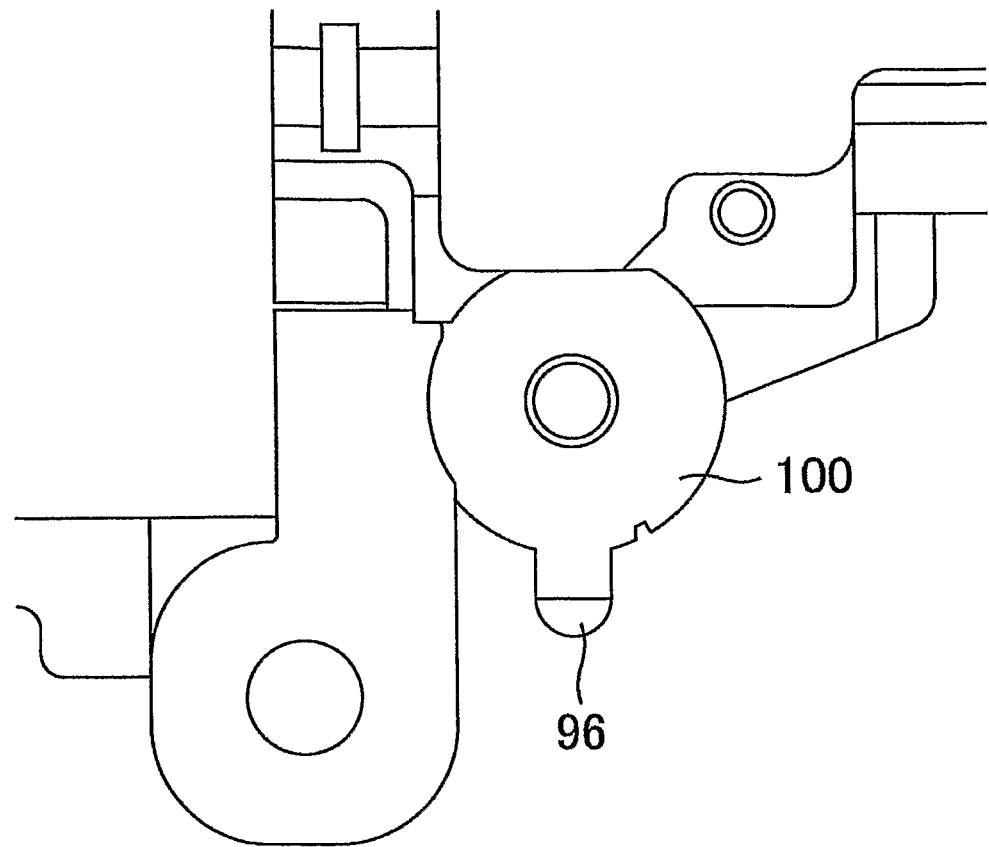
FIG. 35 is a plain view of the essential part in FIG. 33.

Next, various examples of the third embodiment are described. FIG. 31 shows protrusions 94 and walls 93 in the opposite positions to those in FIGS. 28 to 30. The protrusions 94 are formed on the base 37 while the walls 93 are provided in the base 100 of the movable frame 1. Two pairs of stoppers composed of the protrusions 94 and the walls 93 are provided on both side of the X axis direction as in the third embodiment. In this example, it is also able to achieve the same effects as the one in FIGS. 28 to 30.

Another example of the third embodiment is described with reference to FIGS. 32 to 35. In this example, protrusions 96 are differently shaped from the ones in FIGS. 28 to 30. The rest of the structure thereof is the same as that of the third embodiment. The protrusions 96 are bent to the Z and X axis directions and shaped to be partially cut elliptic balls with a larger radius in the Z direction than in the X direction. They face planar walls 92 of the base. In this example, it is also able to achieve the same effects as the one in FIGS. 28 to 30.

Figure 36:
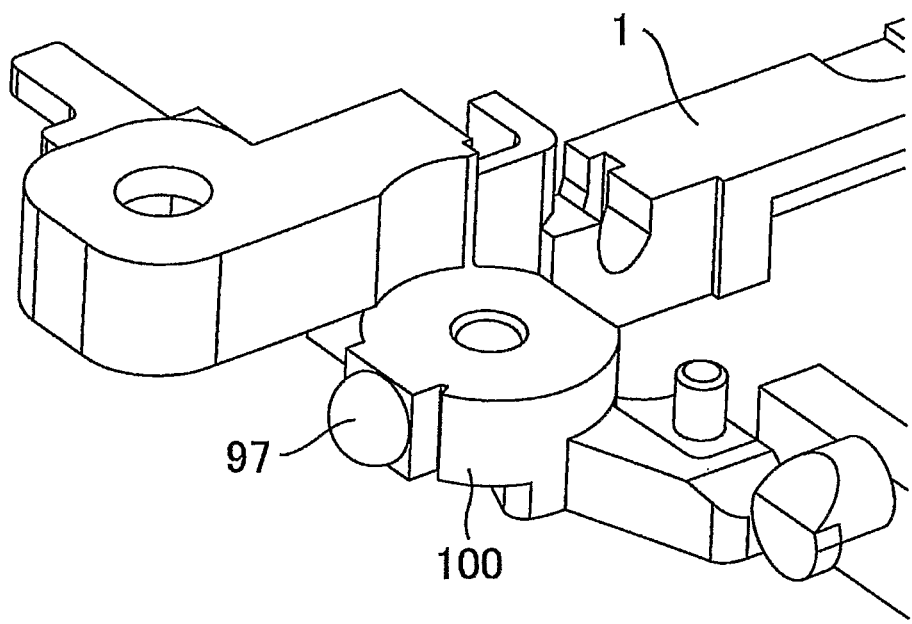
FIG. 36 is a perspective view of another essential part according to the third embodiment.
Figure 37:
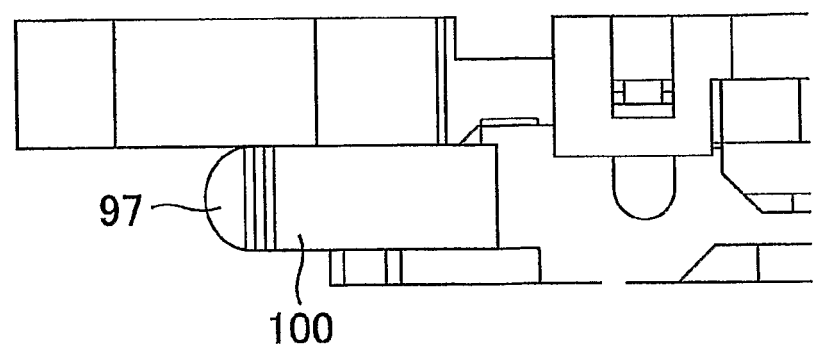
FIG. 37 is a side view of the essential part in FIG. 36.
Figure 38:
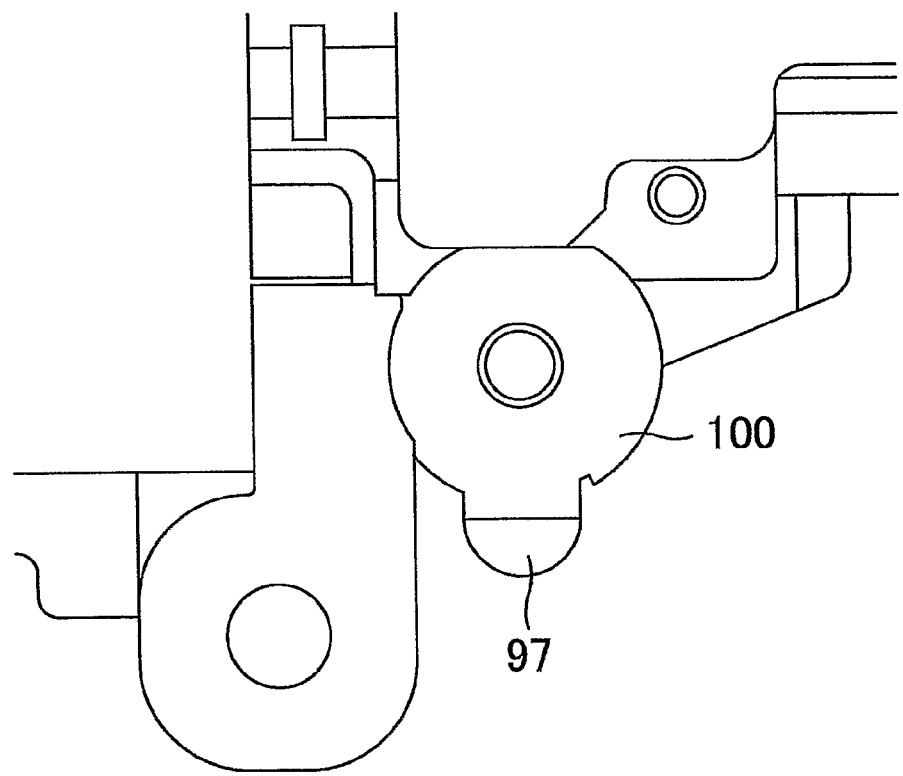
FIG. 38 is a plain view of the essential part in FIG. 36.

Another example of the third embodiment is described with reference to FIG. 36 to FIG. 38. A difference in the stoppers between this example and the third embodiment is in that protrusions 97 are in hemispherical shape. The rest of the structure thereof is the same as that of the third embodiment. The protrusions 97 are bent to the optical axis direction. In this example, it is also able to achieve the same effects as the one in FIGS. 28 to 30.

Figure 39:
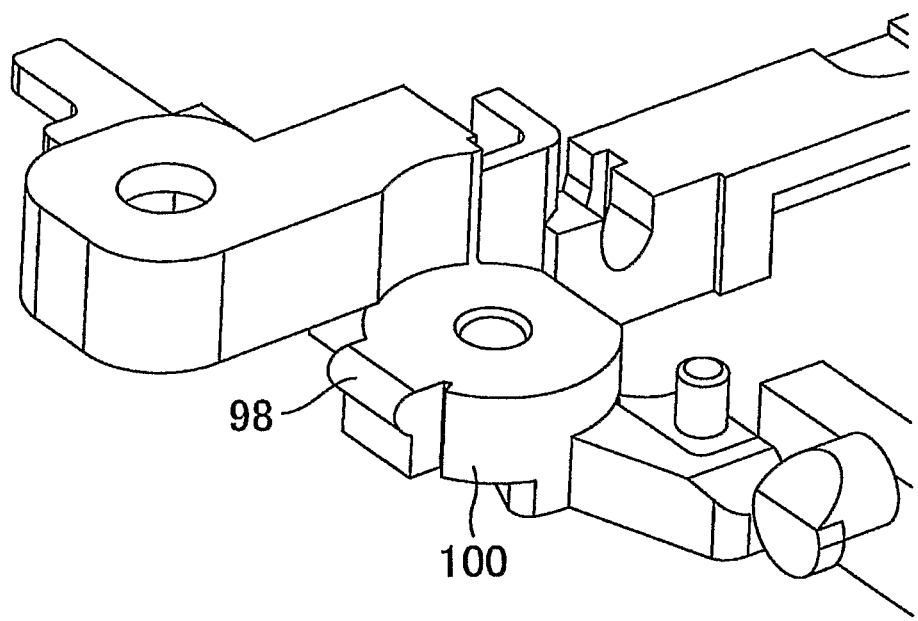
FIG. 39 is a perspective view of another essential part according to the third embodiment.
Figure 40:
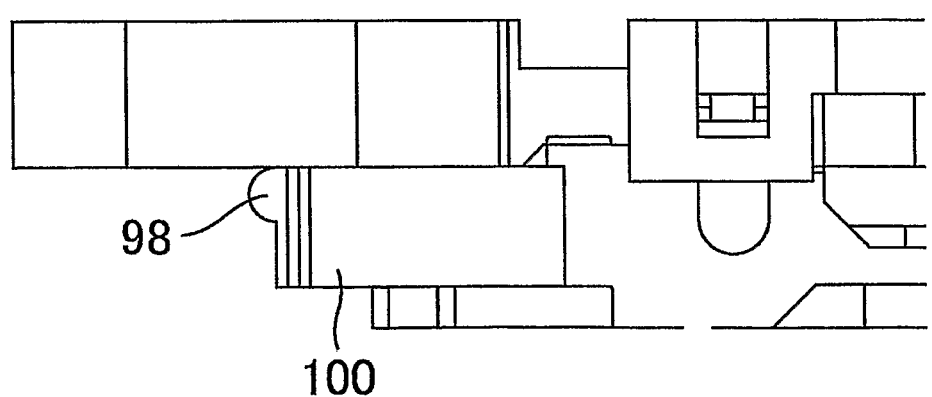
FIG. 40 is a side view of the essential part in FIG. 39.
Figure 41:
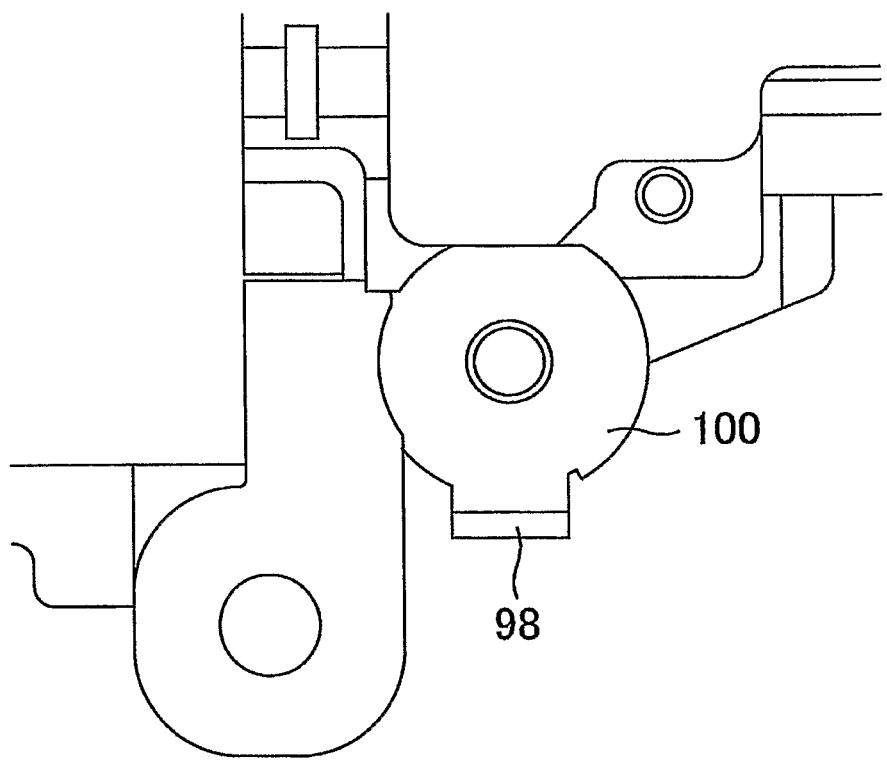
FIG. 41 is a plain view of the essential part in FIG. 39.

Another example of the third embodiment is described with reference to FIG. 39 to FIG. 41. A difference in the stoppers between this example and the third embodiment is in that protrusions 98 are in conic shape formed on the top end of the base 100 of the movable frame 1 in the horizontal direction and the line of action of the cone makes a right angle with the optical axis. The rest of the structure thereof is the same as that of the third embodiment. Such protrusions 98 help reduce or eliminate an error in the position detection of the movable frame 1.

Figure 48A:
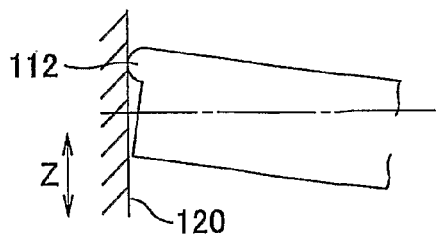
FIGS. 48A, 48B show other examples of a contact state of the base and the movable frame when the image sensor appropriately contact with the base.
Figure 48B:
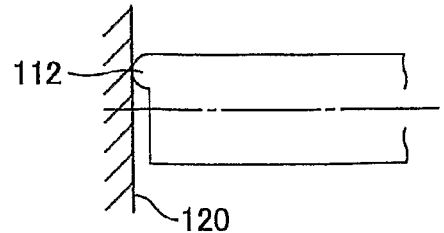

FIG. 48A shows the movable frame 1 with a protrusion 112 (98) in rotation contacting with a wall 120 and FIG. 48B shows the movable frame 1 not in rotation. As shown in the drawings, a contact position of the protrusion 112 and the wall 120 does not change irrespective of the rotation of the movable frame 1. Accordingly, it is able to prevent the movable frame from moving outside the designed moving area and prevent a decrease in the shake correction accuracy.

Figure 42:
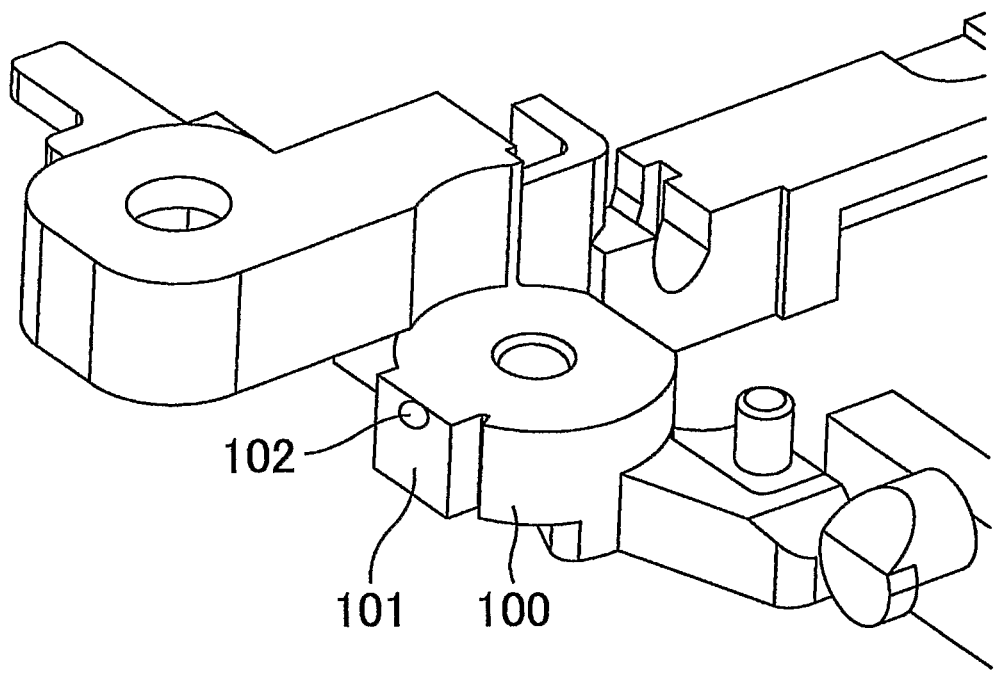
FIG. 42 is a perspective view of another essential part according to the third embodiment.
Figure 43:
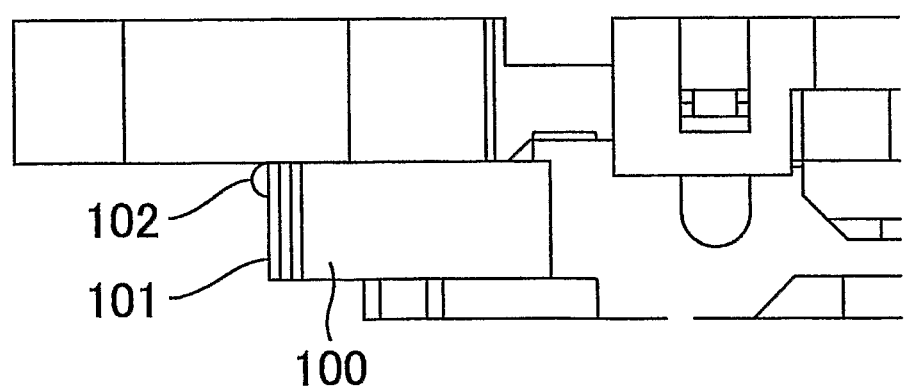
FIG. 43 is a side view of the essential part in FIG. 42.
Figure 44:
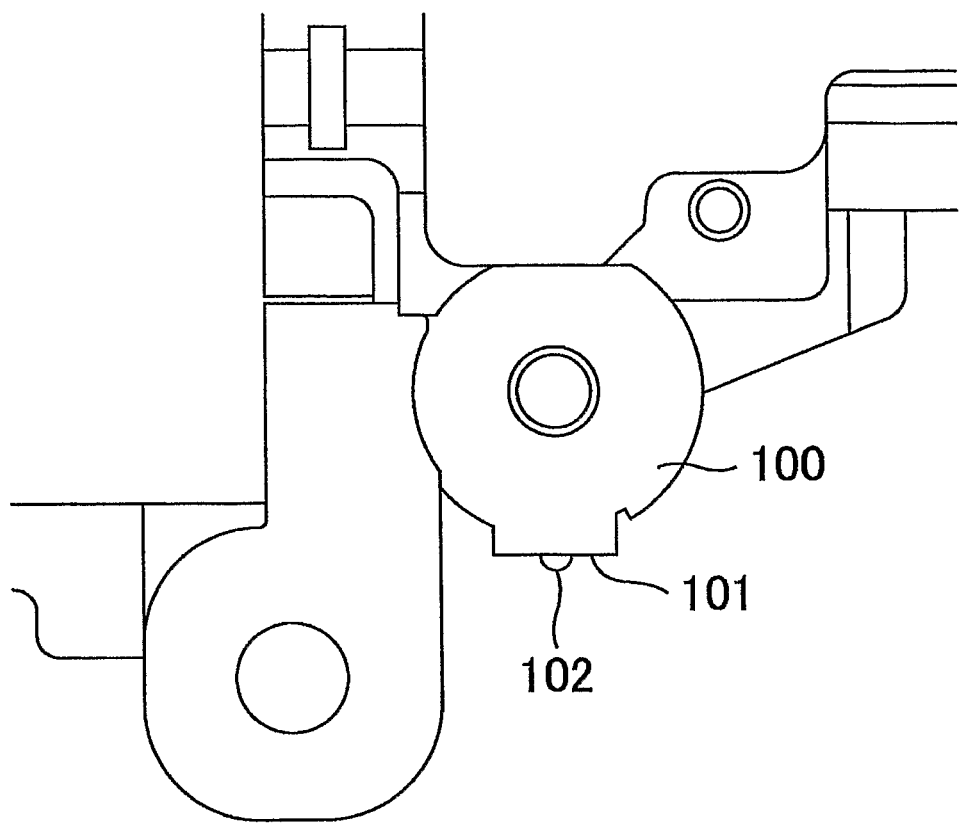
FIG. 44 is a plain view of the essential part in FIG. 42.

Another example of the third embodiment is described with reference to FIG. 42 to FIG. 44. A difference in the stopper between this example and the third embodiment is only in that a protrusion 102 is in hemispherical shape formed on a small part of the top end 101 of the base 100 of the movable frame 1. The rest of the structure thereof is the same as that of the third embodiment. The protrusion 102 achieves the same effects as that in FIG. 48. In this example, it is also able to achieve the same effects as the one in FIGS. 28 to 30.

Figure 45:
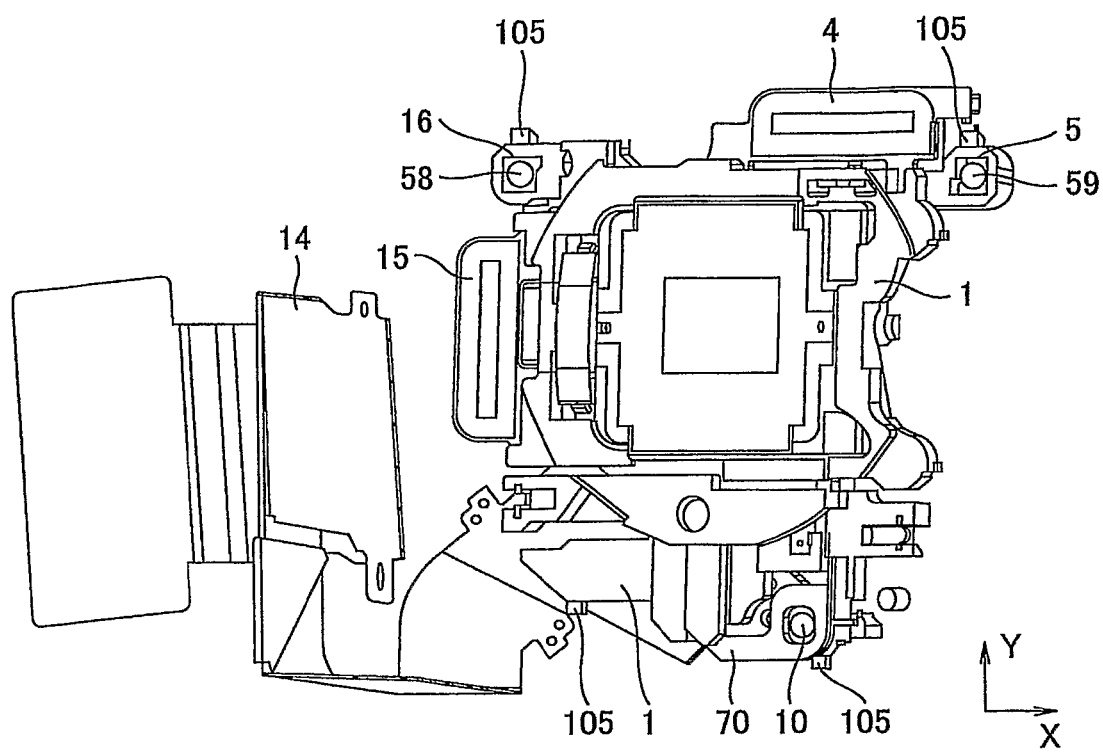
FIG. 45 is a front view of a shake correcting system according to one example of the third embodiment of the present invention.

FIG. 45 shows stoppers in the Y axis direction of the movable frame 1. It is preferable to provide the stoppers in both of the X and Y axis directions. In FIG. 45 protrusions 105 are provided at two places of both ends of the movable frame 1 in the Y axis direction, protruding to outside. A distance between the two protrusions 105 is longer than one-fourth of the total length of the movable frame 1 in the Y axis direction, as the protrusions in the X axis direction. Two of the protrusions 105 on the upper side are provided on sides of the ball movement restrictors 5, 15, one of them on the lower side is provided on a side of the ball movement restrictor 10, and one of them is provided in an appropriate position of the movable frame 1. The protrusions 105 are configured to hit the planar wall of the base 37 to restrict movement of the movable frame 1 in the Y direction due to the shake correction.

As described above referring to FIGS. 27 to 44, the stoppers in FIG. 45 can be differently configured, for example, by providing the protrusions 105 on the base side and the wall on the movable frame side. Moreover, the shape of the protrusions is arbitrarily determined such as sphere, oval sphere, or cone.

According to the third embodiment, the shake correcting system is configured to include the tilt prevention mechanism composed of the protrusions and the walls on the movable frame and the base to restrict the moving area of the movable frame 1 relative to the base. Since the protrusions are bent to the optical axis direction so as to effectively restrict the rotation of the image sensor due to reaction force of the FPC, it is possible to prevent a decrease in the shake correction accuracy when the image sensor is moved to the moving limit for the shake correction.

The shake correcting system according to any one of the embodiments is configured to include magnetic balls and smoothly move the movable frame 1 by rolling the balls and prevent the movable frame 1 from unstably moving by the magnetic force of the balls when correcting camera shakes by moving the image sensor in a plane orthogonal to the optical axis. Thus, by separating the rotation restricting mechanism and slide mechanism of the movable frame, it is made possible to reduce workload for moving the image sensor and electric power consumption of the shake correcting system and elongate the longevity of batteries.

The shake correcting system according to any of the above embodiments can be incorporated into a lens barrel for use in an imaging device such as a digital camera or a video recorder. Further, it can be incorporated into various types of hand-held data terminals such as a mobile phone, a hand-held game machine, and a PDA each with a camera function.

Although the present invention has been described in terms of exemplary embodiments, it is not limited thereto. It should be appreciated that variations may be made in the embodiments described by persons skilled in the art without departing from the scope of the present invention as defined by the following claims.

The invention claimed is:

1. A shake correcting system comprising:
an optical imaging system;
an image sensor which converts an optical image of a subject formed on a light receiving face by the optical imaging system into an electric signal;
a movable unit which comprises a movable frame in which the image sensor is fixed and a rotation restricting element;
a base which movably supports the movable unit in a predetermined plane substantially orthogonal to an optical axis of the optical imaging system;
a drive mechanism which drives the movable unit relative to the base in two directions vertical and orthogonal to the optical axis;
a blur correcting function to correct a blur in the subject image due to a shake of the shake correcting system by moving the image sensor in an opposite direction to a direction of the blur with the drive mechanism;
a rotation restricting mechanism which prevents rotation of the movable frame around the optical axis with the rotation restricting element; and
a slide mechanism which allows the movable unit to be freely movable in the predetermined plane, and comprises a magnet, a magnetic plate attracted to the magnet, a spherical element supported between the magnetic plate and the magnet; and
wherein the shake correcting system further comprises a latch mechanism which latches the movable unit in the base at a default position when the blur correcting function is not used; and
wherein the slide mechanism and the latch mechanism are disposed so that the magnetic plate and the spherical element are maximally attracted to the magnet when the movable unit is placed in the default position relative to the base.

2. A shake correcting system according to claim 1, wherein the movable unit and the base are provided with three slide mechanisms.

3. A shake correcting system according to claim 2, wherein a latch portion of the latch mechanism is placed within a triangle of lines connecting positions of the three slide mechanisms.

4. A shake correcting system according to claim 1, wherein: two tilt prevention mechanisms are provided at both ends of the movable area in one of the two directions, respectively; and the two tilt prevention mechanisms are positioned with substantially equal distances from a line of action of drive force in the one of the two directions.

5. A shake correcting system according to claim 1, wherein the drive mechanism comprises a plurality of coils and a plurality of magnets facing the coils for driving the movable frame.

6. A lens barrel comprising the shake correcting system according to claim 1.

7. An imaging device comprising the shake correcting system according to claim 1.

8. A hand-held terminal comprising the shake correcting system according to claim 1.

9. A shake correcting system comprising:
an optical imaging system;
an image sensor which converts an optical image of a subject formed on a light receiving face by the optical imaging system into an electric signal;
a movable unit which comprises a movable frame in which the image sensor is fixed and a rotation restricting element;
a base which movably supports the movable unit in a predetermined plane substantially orthogonal to an optical axis of the optical imaging system;
a drive mechanism which drives the movable unit relative to the base in two directions vertical and orthogonal to the optical axis;
a blur correcting function to correct a blur in the subject image due to a shake of the shake correcting system by moving the image sensor in an opposite direction to a direction of the blur with the drive mechanism;
a rotation restricting mechanism which prevents rotation of the movable frame around the optical axis with the rotation restricting element; and
a slide mechanism which allows the movable unit to be freely movable in the predetermined plane, and comprises a magnet, a magnetic plate attracted to the magnet, a spherical element supported between the magnetic plate and the magnet; and
wherein the movable frame includes an inclination adjust mechanism which finely adjusts an inclination of the light receiving face of the image sensor relative to the optical axis; and
wherein: the movable frame comprises an image sensor frame in which the image sensor is fixed and an outer frame supporting the image sensor frame, and comprises, between the outer frame and the image sensor frame, a movable support portion as a support point and two adjusting portions to adjust a position of the image sensor frame relative to the outer frame; and the inclination adjust mechanism is configured to finely adjust the inclination of the light receiving face of the image sensor relative to the optical axis by adjusting the position of the image sensor frame with the two adjusting portions.

10. A shake correcting system comprising:
an optical imaging system;
an image sensor which converts an optical image of a subject formed on a light receiving face by the optical imaging system into an electric signal;
a movable unit which comprises a movable frame in which the image sensor is fixed and a rotation restricting element;
a base which movably supports the movable unit in a predetermined plane substantially orthogonal to an optical axis of the optical imaging system;
a drive mechanism which drives the movable unit relative to the base in two directions vertical and orthogonal to the optical axis;
a blur correcting function to correct a blur in the subject image due to a shake of the shake correcting system by moving the image sensor in an opposite direction to a direction of the blur with the drive mechanism;
a rotation restricting mechanism which prevents rotation of the movable frame around the optical axis with the rotation restricting element; and
a slide mechanism which allows the movable unit to be freely movable in the predetermined plane, and comprises a magnet, a magnetic plate attracted to the magnet, a spherical element supported between the magnetic plate and the magnet; and
wherein the shake correcting system further comprises a tilt prevention mechanism which prevents the movable unit from tilting relative to the base when the movable unit hits the base at both ends of a movable area in the two directions; and
wherein: the tilt prevention mechanism is comprised of a contact face provided in one of the base and the movable unit and a protrusion provided in the other of the base and the movable unit and having a convex face at top end; and the tilt prevention mechanism is configured that the contact face and the protrusion hit each other when the movable unit hits the base at both ends of the movable area in the two directions.

11. A shake correcting system comprising:
an optical imaging system;
an image sensor which converts an optical image of a subject formed on a light receiving face by the optical imaging system into an electric signal;
a movable unit which comprises a movable frame in which the image sensor is fixed and a rotation restricting element;
a base which movably supports the movable unit in a predetermined plane substantially orthogonal to an optical axis of the optical imaging system;
a drive mechanism which drives the movable unit relative to the base in two directions vertical and orthogonal to the optical axis;
a blur correcting function to correct a blur in the subject image due to a shake of the shake correcting system by moving the image sensor in an opposite direction to a direction of the blur with the drive mechanism;
a rotation restricting mechanism which prevents rotation of the movable frame around the optical axis with the rotation restricting element; and
a slide mechanism which allows the movable unit to be freely movable in the predetermined plane, and comprises a magnet, a magnetic plate attracted to the magnet, a spherical element supported between the magnetic plate and the magnet; and
wherein the slide mechanism is provided in the rotation restricting element.

12. A shake correcting system according to claim 11, wherein the movable unit and the base are provided with three slide mechanisms.

13. A shake correcting system according to claim 12, wherein a latch portion of the latch mechanism is placed within a triangle of lines connecting positions of the three slide mechanisms.

14. A shake correcting system according to claim 11, wherein: two tilt prevention mechanisms are provided at both ends of the movable area in one of the two directions, respectively; and the two tilt prevention mechanisms are positioned with substantially equal distances from a line of action of drive force in the one of the two directions.

15. A shake correcting system according to claim 11, wherein the drive mechanism comprises a plurality of coils and a plurality of magnets facing the coils for driving the movable frame.

16. A lens barrel comprising the shake correcting system according to claim 11.

17. An imaging device comprising the shake correcting system according to claim 11.

18. A hand-held terminal comprising the shake correcting system according to claim 11.

\* \* \* \* \*